US012451098B2

(12) United States Patent
Chen et al.

(10) Patent No.: US 12,451,098 B2
(45) Date of Patent: Oct. 21, 2025

(54) COMPENSATION CIRCUIT AND DISPLAY DEVICE

(71) Applicant: HKC CORPORATION LIMITED, Guangdong (CN)

(72) Inventors: Qiang Chen, Guangdong (CN); Lidan Ye, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/815,699

(22) Filed: Aug. 26, 2024

(65) Prior Publication Data

US 2025/0124891 A1 Apr. 17, 2025

(30) Foreign Application Priority Data

Oct. 12, 2023 (CN) ......................... 202311316668.2

(51) Int. Cl.
*G09G 3/36* (2006.01)

(52) U.S. Cl.
CPC ... *G09G 3/3696* (2013.01); *G09G 2310/0294* (2013.01); *G09G 2310/08* (2013.01); *G09G 2320/0209* (2013.01); *G09G 2330/021* (2013.01)

(58) Field of Classification Search
CPC ......... G09G 3/3696; G09G 2310/0294; G09G 2310/08; G09G 2320/0209; G09G 2330/021
See application file for complete search history.

(56) References Cited

U.S. PATENT DOCUMENTS

| | | | | |
|---|---|---|---|---|
| 2006/0071896 A1* | 4/2006 | Nakata | G09G 3/20 345/94 |
| 2016/0372025 A1 | 12/2016 | Ahn et al. | |
| 2021/0125573 A1* | 4/2021 | Wang | G09G 5/393 |

FOREIGN PATENT DOCUMENTS

| | | | |
|---|---|---|---|
| CN | 106898323 A | 6/2017 |
| CN | 112599106 A | 4/2021 |
| CN | 115346461 A | 11/2022 |
| JP | 2012088512 A | 5/2012 |
| KR | 20130052399 A | 5/2013 |

* cited by examiner

*Primary Examiner* — Kwang-Su Yang

(57) ABSTRACT

A compensation circuit and a display device. The compensation circuit includes a timing controller, a power management circuit, an operational amplifier circuit, and a delay circuit. The delay circuit is configured to prolong a time duration of the operational amplifier circuit in the operating state in a first stage, and the delay circuit controls the operational amplifier circuit to stop operation when the delay circuit is able to stably output a common voltage to the display panel. A time duration of outputting the common voltage to the display panel is prolonged in a second stage. When the operational amplifier circuit is in the operation state, the delay circuit stops outputting the common voltage to the display panel.

18 Claims, 18 Drawing Sheets

COMPENSATION CIRCUIT AND DISPLAY DEVICE

CROSS-REFERENCE TO RELATED APPLICATION

This application claims priority to Chinese patent application No. 202311316668.2, filed on Oct. 12, 2023, and entitled "compensation circuit and display device", the entire contents of which is incorporated herein by reference.

TECHNICAL FIELD

The present application relates to the field of displaying technologies, and more particularly, to a compensation circuit and a display device.

BACKGROUND

With the development of liquid crystal display technology, the display effect of display panels is becoming more and more important. In order to achieve a better display effect, commonly used techniques include a common voltage compensation method, a polarity inversion method, etc.

The common voltage compensation method is generally suitable for solving a common display problem and is realized through a compensation circuit. The compensation circuit is usually composed of an operational amplifier, the operational amplifier determines a compensation coefficient according to a ratio of an input resistor to a feedback resistor, and then determines a compensating voltage according to the compensation coefficient, and then outputs the compensating voltage to a display panel to compensate a supply voltage in the display panel, thereby achieving an objective of improving the display quality of the display panel. In addition, in the event that the common voltage compensation method cannot compensate the supply voltage, a polarity inversion method may also be used to solve a special display problem. The polarity inversion method improves the display quality by changing a driving mode of liquid crystals.

However, in the related art, when switching is performed between the common voltage compensation method and the polarity inversion method, an abnormal display image of the display panel may be caused. Thus, there is an urgent need to develop a new compensation circuit to solve the problem mentioned above.

SUMMARY

In view of this, embodiments of the present application provide a compensation circuit and a display device which are directed at reducing a possibility of occurrence of abnormal display image of the display panel and improving a stability of the compensation circuit, when switching between the common voltage compensation method and the polarity inversion method.

In order to achieve this objective, in the first aspect, a compensation circuit is provided in the embodiments of the present application. The compensation circuit includes: a timing controller, a power management circuit, an operational amplifier circuit, and a delay circuit. The timing controller is respectively connected to the display panel and the delay circuit, and is configured to output a partial decode-and-forward (PDF) signal to the display panel and the delay circuit. The power management circuit is respectively connected to the delay circuit and the operational amplifier circuit, and is configured to output a common voltage and an operating voltage to the delay circuit, and output the common voltage to the operational amplifier circuit. The delay circuit is further connected to the operational amplifier circuit and the display panel respectively, and is configured to, when the display panel is controlled by the PDF signal to perform a polarity inversion, output the common voltage to the display panel in a first stage, and output the operating voltage to the operational amplifier circuit in a first sub-stage of the first stage, and stop outputting the operating voltage to the operational amplifier circuit in a second sub-stage of the first stage. The delay circuit is further configured to, when the PDF signal controls the display panel to do not perform the polarity inversion, output the operating voltage to the operational amplifier circuit in a second stage, and output the common voltage to the display panel in a third sub-stage of the second stage, and stop outputting the common voltage to the display panel in a fourth sub-stage of the second stage. The operational amplifier circuit is further connected to the display panel, and is configured to receive the common voltage output by the power management circuit in the first stage and the second stage, receive the operating voltage output by the delay circuit and a feedback voltage output by the display panel in the first sub-stage, the third sub-stage and the fourth sub-stage, and output a compensating voltage to the display panel.

In one embodiment, the timing controller is configured to detect display problems of the display panel and output a high level PDF signal to the display panel and the delay circuit so as to control the display panel to perform the polarity inversion, when the display panel has a target display problem. The timing controller is further configured to detect the display problems of the display panel and output a low-level PDF signal to the display panel and the delay circuit when the display panel has a non-target display problem, to enable the display panel to do not perform the polarity inversion. The display problems include greenish or crosstalk of different severity degrees, and the target display problem is used to indicate relatively higher greenish or crosstalk in the display problems.

In one embodiment, the delay circuit includes a first switch and a second switch. A control terminal of the second switch is connected to an output of the timing controller, an input of the second switch is connected to a first output of the power management circuit, and an output of the second switch is respectively connected to a common voltage terminal of the display panel and a control terminal of the first switch. An input of the first switch is connected to a second output of the power management circuit, and an output of the first switch is connected to a power terminal of the operational amplifier circuit. When the PDF signal is at a high level, in the first stage, the second switch is turned-on and an output of the second switch outputs the common voltage to the display panel; in the first sub-stage, the first switch is turned-on, and the first switch outputs the operating voltage to the operational amplifier circuit; in the second sub-stage, the first switch is turned-off, and the first switch stops outputting the operating voltage to the operational amplifier circuit.

In one embodiment, the delay circuit includes a first switch and a second switch. A control terminal of the first switch is connected to an output of the timing controller, an input of the first switch is connected to a second output of the power management circuit, and an output of the first switch is connected to a power terminal of the operational amplifier circuit and the control terminal of the second switch, respectively. An input of the second switch is connected to a first output of the power management circuit, and an output of the second switch is connected to a common voltage terminal of the display panel. When the PDF signal is at a low level, in the second stage, the first switch is turned-on and the first switch outputs the operating voltage to the operational amplifier circuit; in the third sub-stage, the second switch is turned-on, the second switch outputs the common voltage to the display panel; in the fourth sub-stage, the second switch is turned-off, and thus the second switch stops outputting the common voltage to the display panel.

In one embodiment, the delay circuit includes a first switch, a second switch, a first diode and a second diode. An output of the timing controller is connected to a control terminal of the second switch through the first diode, and is further connected to a control terminal of the first switch through the second diode. A control terminal of the first switch is further connected to an output of the second switch, an input of the first switch is connected to a second output of the power management circuit, and an output of the first switch is respectively connected to a control terminal of the second switch and a power terminal of the operational amplifier circuit. The output of the second switch is further connected to a common voltage terminal of the display panel, and an input of the second switch is connected to a first output of the power management circuit.

In one embodiment, the delay circuit is configured to, when the PDF signal controls the display panel to perform the polarity inversion, output the common voltage to the display panel in the first stage, and output the operating voltage to the operational amplifier circuit in the first sub-stage of the first stage, and stop outputting the operating voltage to the operational amplifier circuit in the second sub-stage of the first stage, includes: when the PDF signal is at a high level, in the first stage, the first diode is turned-on, the second switch is turned-on, and an output of the second switch outputs the common voltage to the display panel; in the first sub-stage, the first switch is turned-on, and the first switch outputs the operating voltage to the operational amplifier circuit; in the second sub-stage, the first switch is turned-off, and thus the first switch stops outputting the operating voltage to the operational amplifier circuit. The delay circuit is further configured to, when the PDF signal controls the display panel to do not perform the polarity inversion, output the operating voltage to the operational amplifier circuit in the second stage, and output the common voltage to the display panel in the third sub-stage of the second stage, and stop outputting the common voltage to the display panel in the fourth sub-stage of the second stage, includes: when the PDF signal is at a low level, in the second stage, the second diode is turned-on, the first switch is turned-on, and the first switch outputs the operating voltage to the operational amplifier circuit; in the third sub-stage, the second switch is turned-on, the second switch outputs the common voltage to the display panel; in the fourth sub-stage, the second switch is turned-off, and thus the second switch stops outputting the common voltage to the display panel.

In one embodiment, the delay circuit further includes a delayer; an output of the timing controller is respectively connected to a first input of the delayer and a control terminal of the second switch through the first diode, and is respectively connected to a second input of the delayer and a control terminal of the first switch through the second diode. A first output of the delayer is connected to the control terminal of the first switch, and a second output of the delayer is connected to the control terminal of the second switch. An input of the first switch is connected to a second output of the power management circuit, and an output of the first switch is connected to a power terminal of the operational amplifier circuit. An input of the second switch is connected to a first output of the power management circuit, and an output of the second switch is connected to a common voltage terminal of the display panel.

In one embodiment, when the PDF signal is at a high level, in the first stage, the first diode is turned-on, the second switch is turned-on, and an output of the second switch outputs the common voltage to the display panel; in the first sub-stage, the delayer stops outputting the high-level PDF signal to the first switch, the first switch is turned-on, and thus the first switch outputs the operating voltage to the operational amplifier circuit; in the second sub-stage, the delayer outputs the high-level PDF signal to the first switch to control the first switch to be turned-off, and thus the first switch stops outputting the operating voltage to the operational amplifier circuit. When the PDF signal is at a low level, in the second stage, the second diode is turned-on, the first switch is turned-on, and thus the first switch outputs the operating voltage to the operational amplifier circuit; in the third sub-stage, the delayer stops outputting the low-level PDF signal to the second switch, the second switch is turned-on, and thus the second switch outputs the common voltage to the display panel; in the fourth sub-stage, the delayer outputs the low-level PDF signal to the second switch to control the second switch to be turned-off, and thus the second switch stops outputting the common voltage to the display panel.

In one embodiment, the delay circuit is further configured to start or stop outputting the common voltage to the display panel according to a comparison between the feedback voltage and a target threshold value, when the PDF signal controls the display panel to do not perform the polarity inversion.

In the second aspect, a display device is provided in the embodiments of the present application. The display device includes a display panel and any compensation circuit in the first aspect. The display panel is configured to display an image and output a feedback voltage to the compensation circuit, and receive a PDF signal, a compensating voltage and a common voltage output by the compensation circuit.

According to the compensation circuit and the display device provided in the embodiments of the present application, the compensation circuit includes the timing controller, the power management circuit, the operational amplifier circuit, and the delay circuit. The timing controller is respectively connected to the display panel and the delay circuit, and the timing controller is configured to output the partial decode-and-forward (PDF) signal to the display panel and the delay circuit. The power management circuit is respectively connected to the delay circuit and the operational amplifier circuit, and is configured to output the common voltage and the operating voltage to the delay circuit, and output the common voltage to the operational amplifier circuit. The delay circuit is further connected to the operational amplifier circuit and the display panel and is configured to, when the PDF signal controls the display panel to perform the polarity inversion, output the common voltage to the display panel in the first stage, and output the operating voltage to the operational amplifier circuit in the first sub-stage of the first stage, and stop outputting the operating voltage to the operational amplifier circuit in the second sub-stage of the first stage. The delay circuit is further configured to, when the PDF signal controls the display panel to do not perform the polarity inversion, output the operating voltage to the operational amplifier circuit in the second stage, and output the common voltage to the display panel in the third sub-stage of the second stage, and stop outputting the common voltage to the display panel in the fourth sub-stage of the second stage. The operational amplifier circuit is further connected to the display panel and is configured to receive the common voltage output by the power management circuit in the first stage and the second stage. The operational amplifier circuit receives the operating voltage output by the delay circuit and the feedback voltage output by the display panel in the first sub-stage, the third sub-stage and the fourth sub-stage, and outputs the compensating voltage to the display panel.

The compensation circuit in the embodiments of the present application may prolong the time duration of the operational amplifier circuit in the operating state through the delay circuit in the first stage. When the delay circuit may stably output the common voltage to the display panel, the delay circuit controls the operational amplifier circuit to stop operation; the time duration of outputting the common voltage to the display panel may be prolonged in the second stage. When the operational amplifier circuit is in the operating state, the delay circuit stops outputting the common voltage to the display panel. Thus, the compensation circuit may alleviate a problem of losing of the common voltage due to instantaneous switching when switching between the common voltage compensation method and the polarity inversion method. Thus, the occurrence of abnormal display image of the display panel may be reduced, and the stability of the compensation circuit may be improved accordingly.

DETAILED DESCRIPTION OF EMBODIMENTS

The embodiments of the present application are described with reference to the accompanying drawings in the embodiments of the present application. The terms used in the embodiments of the present application are only intended to explain the specific embodiments of the present application, rather than being intended to limit the present application. The embodiments described below may be combined with each other, similar concepts or processes may not be repeatedly described in some embodiments.

Currently, a display panel often has some common display problems, such as crosstalk, greenish (Greenish, which means that the three primary colors of red, green, and blue are transmitted incompletely, green screen occurs). The crosstalk may be classified into common crosstalk (a phenomenon of cross-color between two adjacent pixels) and Crosstalk (a phenomenon that an image in certain region in the screen affects a brightness of an adjacent region). In the related art, a timing controller may detect and indicate a severity of the display problem of the display panel. For example, when a non-target display problem occurs (i.e., the severity of crosstalk or Greenish is relatively lower, that is, a common display problem), a partial decode-and-forward (PDF) function is not turned-on (equaling the PDF function being turned-off), and the timing controller may output a low-level PDF signal to indicate that a common display problem occurs in the display panel. Correspondingly, in this case, a common voltage (Voltage Common Mode, VCOM) compensation method is usually used to eliminate the aforesaid display problem and improve the display quality of the display panel.

When a target display problem occurs (i.e., the severity of crosstalk or Greenish is relatively higher, that is, a special display problem), the PDF function is turned-on, and the timing controller outputs a high-level PDF signal to indicate that the display panel has a serious display problem. Correspondingly, in this case, it is usually necessary to use a polarity inversion mode to change the driving mode of the liquid crystal screen in the display panel, thereby eliminating the display problem and improving the display quality of the display panel. Change of the polarity inversion mode may be controlled by using the high-level PDF signal, and the polarity inversion mode includes: frame inversion, column inversion, row inversion, and dot inversion. Refresh rates of images under different polarity inversions are different, and the required power consumptions are also different.

The connection relationship and the working principle of the existing compensation circuit are described below with reference to FIG. 1.

Figure 1:
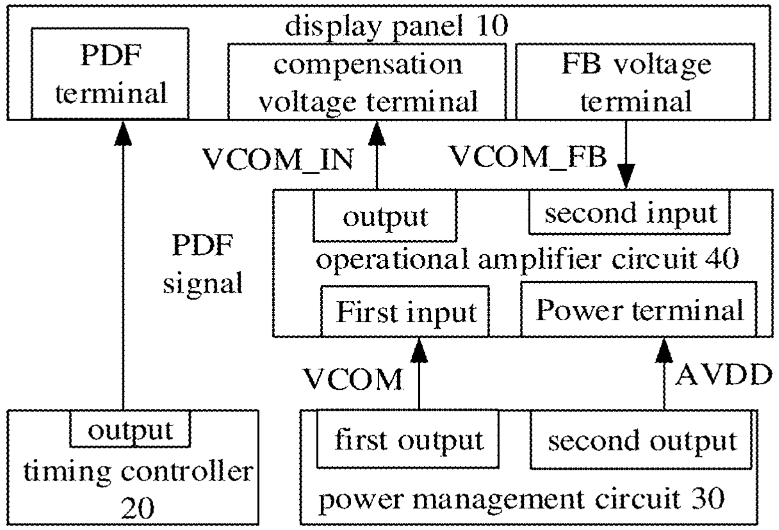
FIG. 1 is a schematic circuit configuration of an existing compensation circuit.

FIG. 1 is a schematic circuit configuration of the existing compensation circuit, as shown in FIG. 1, the compensation circuit includes a display panel 10, a timing controller 20, a power management circuit 30, and an operational amplifier circuit 40. The timing controller 20 is connected to the display panel 10 through wiring, and is configured to provide a PDF signal to the display panel. A first output of the power management circuit 30 is connected to a first input of the operational amplifier circuit 40, a second output of the power management circuit 30 is connected to a power terminal of the operational amplifier circuit 40, a second input of the operational amplifier circuit 40 is connected to a feedback voltage terminal of the display panel 10, and an output of the operational amplifier circuit 40 is connected to a compensating voltage terminal of the display panel 10.

The PDF signal is used to instruct the display panel 10 to perform polarity inversion to change a driving mode of liquid crystals.

The power management circuit 30 is configured to provide a common voltage VCOM and an operating voltage AVDD required for operating the operational amplifier circuit 40 to the operational amplifier circuit 40. The operational amplifier circuit 40 is configured to receive a feedback voltage VCOM_FB provided by the display panel 10 and perform an arithmetic calculation based on the common voltage VCOM and the feedback voltage VCOM_FB, and provide a compensating voltage VCOM_IN to the display panel 10.

The working principle shown in FIG. 1 is that when the timing controller 20 detects that the display problem of the display panel 10 is a common display problem, the timing controller 20 outputs a low-level PDF signal to the display panel 10, which indicates that the display problem is a common display problem, and the display problem can be solved only by performing VCOM compensation (i.e., the common voltage compensation method).

In particular, when receiving the operating voltage AVDD provided by the power management circuit 30, the operational amplifier circuit 40 is in an operating state, and receives the common voltage VCOM provided by the power management circuit 30 and the feedback voltage VCOM_FB provided by the display panel 10, and then determines a compensation coefficient according to a ratio of an internal feedback resistor to an input resistor, and subsequently outputs the compensating voltage VCOM_IN to the display panel 10 according to the compensation coefficient to compensate the common voltage in the display panel 10, thereby solving the display problem of the display panel 10.

The operational amplifier circuit 40 in the operating state may receive the common voltage VCOM output by the power management circuit 30, receive the feedback voltage VCOM_FB output by the display panel 10, determine the compensating voltage VCOM_IN based on the common voltage VCOM and the feedback voltage VCOM_FB, and then output the compensating voltage VCOM_IN to the display panel 10.

When the timing controller 20 detects that the display problem of the display panel 10 is a special display problem, the timing controller 20 inputs a high-level PDF signal to the display panel 10, which indicates that the display problem is a special display problem which can only be solved by changing the driving mode of the liquid crystals in the display panel 10.

In particular, after the display panel 10 receives the high-level PDF signal, the driving mode of the liquid crystals in the display panel 10 will be changed, the display panel 10 will be driven by another driving mode, such that the display problem of the display panel 10 can be improved. For example, when the PDF signal is a low-level signal, the driving mode of the liquid crystals is row inversion; when the PDF signal is a high-level signal, the driving mode of the liquid crystals will be converted from the row inversion into the column inversion. This is because that the inversion numbers of the liquid crystals increase and the display quality improves under the driving mode of column inversion. Thus, the display problem of the display panel 10 will be improved.

Since the compensating voltage VCOM_IN is an AC voltage, the common voltage VCOM is a DC voltage, when switching is performed between the common voltage compensation method and the polarity inversion method, the common voltage VCOM may be lost, an abnormal display image of the display panel 10 may be caused. Therefore, a new compensation circuit for solving the above problem is urgently needed.

In view of this, the present application provides a compensation circuit. The compensation circuit includes a timing controller, a power management circuit, an operational amplifier circuit, and a delay circuit. The timing controller is respectively connected to the display panel and the delay circuit, and the timing controller is configured to output a PDF signal to the display panel and the delay circuit; the power management circuit is respectively connected to the delay circuit and the operational amplifier circuit, and is configured to output a common voltage and an operating voltage to the delay circuit, and output the common voltage to the operational amplifier circuit. The delay circuit is further connected to the operational amplifier circuit and the display panel respectively, and is configured to, when the PDF signal controls the display panel to perform the polarity inversion, output the common voltage to the display panel in the first stage, output the operating voltage to the operational amplifier circuit in the first sub-stage of the first stage, and stop outputting the operating voltage to the operational amplifier circuit in the second sub-stage of the first stage.

The delay circuit is further configured to, when the display panel is controlled by the PDF signal to do not perform polarity inversion, output the operating voltage to the operational amplifier circuit in the second stage, and output the common voltage to the display panel in the third sub-stage of the second stage, and stop outputting the common voltage to the display panel in the fourth sub-stage of the second stage. The operational amplifier circuit is further connected to the display panel, and the operational amplifier circuit is configured to receive the common voltage output by the power management circuit in the first stage and the second stage. The operational amplifier circuit receives the operating voltage output by the delay circuit and the feedback voltage output by the display panel in the first sub-stage, the third sub-stage and the fourth sub-stage, and outputs the compensating voltage to the display panel.

According to the compensation circuit provided in this embodiment of the present application, the operating state of the operational amplifier circuit may be prolonged by the delay circuit in the first stage. When the delay circuit can output the common voltage to the display panel stably, the delay circuit controls the operational amplifier circuit to stop operation. In the second stage, the time duration of outputting the common voltage to the display panel may be prolonged. When the operational amplifier circuit is in the operating state, the delay circuit stops outputting the common voltage to the display panel. Thus, the problem of losing of the common voltage due to instantaneous switching may be reduced when the compensation circuit is switched between the common voltage compensation method and the polarity inversion method, such that the occurrence of abnormal display image of the display panel may be reduced, and the stability of the compensation circuit may be improved accordingly.

The compensation circuit provided in the embodiments of the present application is described in detail below.

First Embodiment

Figure 2:
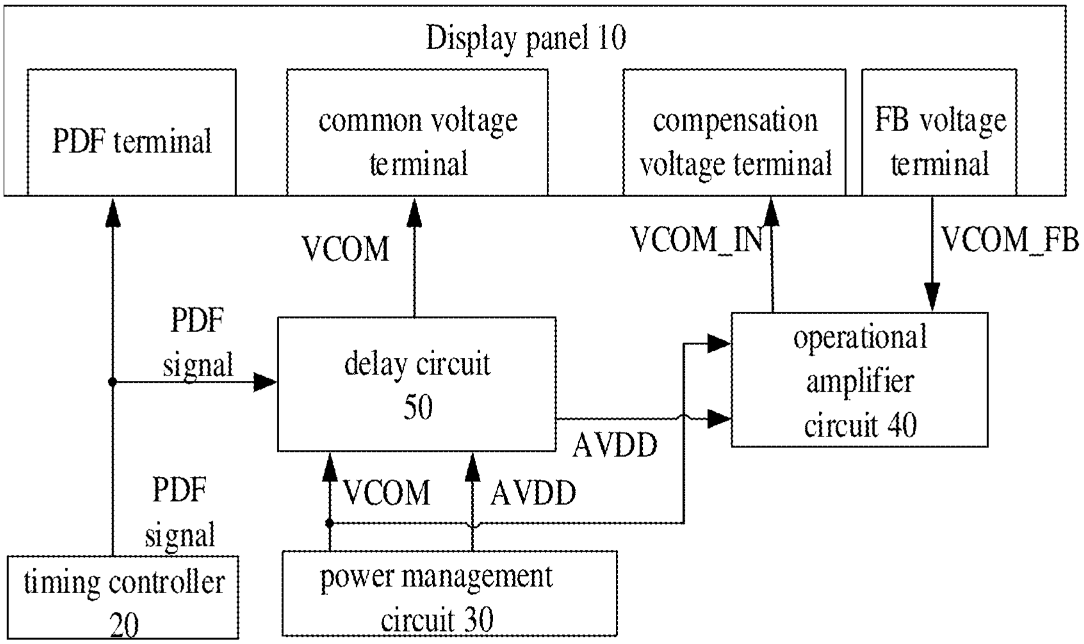
FIG. 2 is a schematic circuit configuration of one compensation circuit according to one embodiment of the present application.
Figure 3:
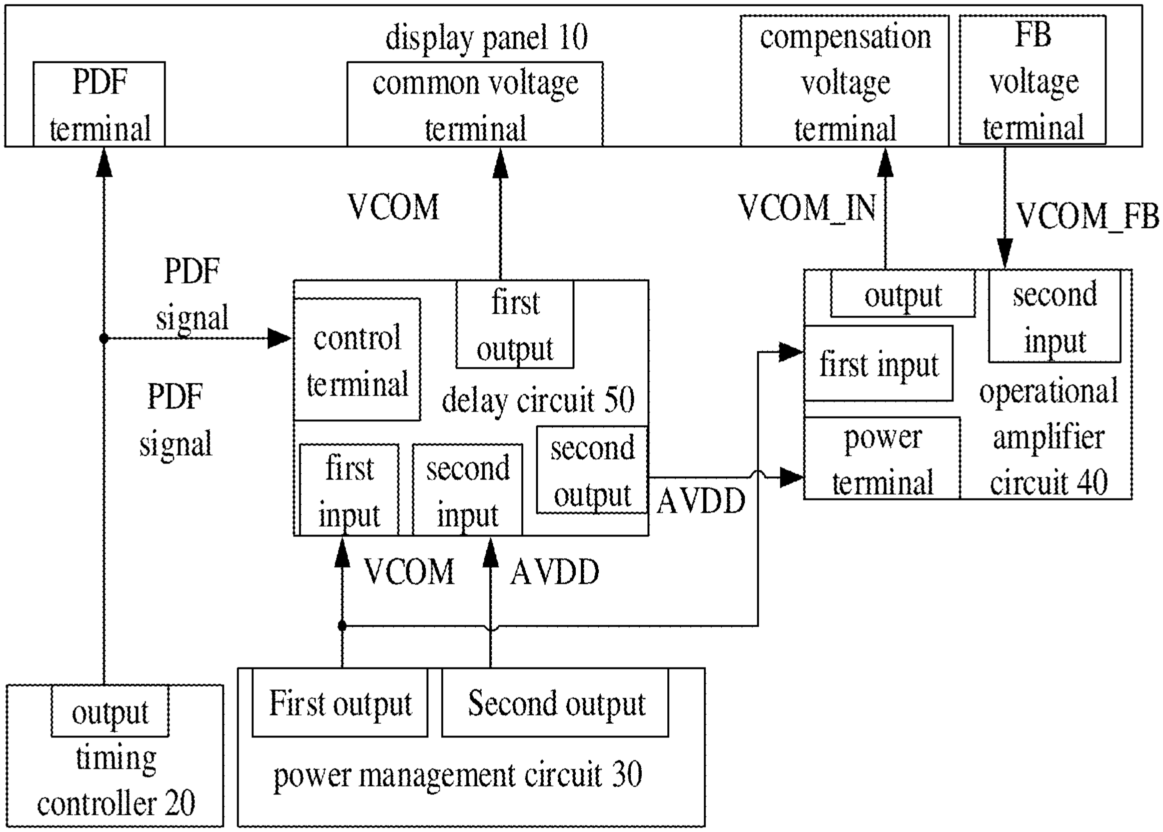
FIG. 3 is a schematic circuit configuration of another compensation circuit, according to one embodiment of the present application.

FIG. 2 and FIG. 3 are schematic circuit configurations of the compensation circuit according to one embodiment of the present application. As shown in FIG. 2 and FIG. 3, the compensation circuit includes a timing controller 20, a power management circuit 30, an operational amplifier circuit 40, and a delay circuit 50. For the convenience of explanation, various terminals are added in FIG. 3 with respect to FIG. 2.

As shown in FIG. 3, an output of the timing controller 20 is respectively connected to a PDF terminal of the display panel 10 and a control terminal of the delay circuit 50, and the timing controller 20 is configured to output the PDF signal to the display panel 10 and the delay circuit 50. For example, when the display panel 10 has a common display problem, a low-level PDF signal is output; when the display panel 10 has a special display problem, a high-level PDF signal is output.

A first output of the power management circuit 30 is connected to a first input of the delay circuit 50 and a first input of the operational amplifier circuit 40, and the power management circuit 30 is configured to output the common voltage VCOM to the delay circuit 50 and the operational amplifier circuit 40. A second output of the power management circuit 30 is connected to a second input of the delay circuit 50, and is configured to output an operating voltage AVDD to the delay circuit 50.

A first output of the delay circuit 50 is connected to the common voltage terminal of the display panel 10, and a second output of the delay circuit 50 is connected to a power terminal of the operational amplifier circuit 40. The delay circuit 50 is configured to, when the display panel 10 is controlled by the PDF signal to perform the polarity inversion, output the common voltage VCOM to the display panel 10 in the first stage, and output the operating voltage AVDD to the operational amplifier circuit 40 in the first sub-stage of the first stage, and stop outputting the operating voltage AVDD to the operational amplifier circuit 40 in the second sub-stage of the first stage. The delay circuit 50 is further configured to, when the display panel 10 is controlled by the PDF signal to do not perform the polarity inversion, output the operating voltage AVDD to the operational amplifier circuit 40 in the second stage, output the common voltage VCOM to the display panel 10 in the third sub-stage of the second stage, and stop outputting the common voltage VCOM to the display panel 10 in the fourth sub-stage of the second stage.

An output of the operational amplifier circuit 40 is connected to a feedback voltage terminal of the display panel 10, and a second input of the operational amplifier circuit 40 is connected to the feedback voltage terminal of the display panel 10. The operational amplifier circuit 40 is configured to receive the common voltage VCOM output by the power management circuit 30 in the first stage and the second stage. The operational amplifier circuit 40 receives the operating voltage AVDD output by the delay circuit 50 and the feedback voltage VCOM_FB output by the display panel 10 in the first sub-stage, the third sub-stage and the fourth sub-stage, and outputs the compensating voltage VCOM_IN to the display panel 10.

The display panel 10 is controlled by the PDF signal to perform the polarity inversion refers to the timing controller 20 outputs a high-level PDF signal to the display panel 10 and the delay circuit 50 so as to control the display panel 10 to perform polarity inversion and thereby changing the driving mode of the liquid crystals, when the timing controller 20 detects that the display panel 10 has a target display problem. When the timing controller 20 detects that the display panel 10 has a non-target display problem, the timing controller 20 outputs a low-level PDF signal to the display panel 10 and the delay circuit 50, the display panel 10 does not perform the polarity inversion, and the original driving mode of the liquid crystals is not changed. The display problem includes greenish or crosstalk of different severity degrees, the target display problem is used to indicate very serious greenish or crosstalk in the display problem.

The first stage is a stage used to indicate that the PDF signal is at a high level; the second stage is a stage used to indicate that the PDF signal is at a low level. The first sub-stage represents a start stage of the delay circuit when the PDF signal is at the high level, the second sub-stage represents a stable stage of the delay circuit when the PDF signal is at the high level, the third sub-stage represents a start stage of the delay circuit when the PDF signal is at the low level, and the fourth sub-stage represents a stable stage of the delay circuit when the PDF signal is at the low level. The low-level PDF signal may be a zero voltage or a negative voltage. In an actual application, the low-level PDF signal may be selected according to an actual situation. The low level PDF signal is not particularly limited in the embodiments of the present application.

The display panel 10 is configured to display an image, receive the common voltage VCOM provided by the delay circuit 50, provide the feedback voltage VCOM_FB to the operational amplifier circuit 40, receive the compensating voltage VCOM_IN provided by the operational amplifier circuit 40, and receive the PDF signal provided by the timing controller 20. The display panel 10 may be a liquid crystal display (Liquid Crystal Display, LCD), or be an organic light-emitting diode (Organic Light-Emitting Diode, OLED), a twisted nematic (Twisted Nematic, TN) display panel, a vertical arrangement (VA) display panel, or the like. The type of the display panel 10 is not particularly limited in the embodiments of the present disclosure.

The timing controller 20 may be an integrated chip having a plurality of pins with different functions. In this embodiment of the present application, only one pin having a PDF function in the chip may be selected, and this pin is connected to the PDF terminal of the display panel 10 and a control terminal of the delay circuit 50 through connecting lines. The connecting lines are referred to as PDF signal lines.

The power management circuit 30 may be a power management integrated circuit (Power Management Integrated Circuit, PMIC), a gamma correction buffer circuit chip (P_gamma), and the like, which is not particularly limited in the embodiments of the present application. It should be noted that the power management circuit 30 may generate a plurality of voltage values of different sizes, and provide different required voltages to different components. For example, as shown in FIGS. 2-19, a first output of the power management circuit 30 outputs the common voltage VCOM, and a second output of the power management circuit 30 outputs the operating voltage AVDD. In actual application, the power management circuit 30 may also generate other voltage according to the requirement.

The operational amplifier circuit 40 may include an operational amplifier, or alternatively, the operational amplifier circuit 40 may include a plurality of operational amplifiers, the number of the operational amplifier 40 is not particularly limited in the embodiments of the present application.

When the operational amplifier circuit 40 includes only one operational amplifier, the first input of the operational amplifier circuit 40 represents a non-inverting input (i.e., "+", not shown in the figures) of the operational amplifier in the operational amplifier circuit 40; the second input of the operational amplifier circuit 40 represents an inverting input (i.e., "−", not shown in the figures) of the operational amplifier in the operational amplifier circuit 40. The power terminal of the operational amplifier circuit 40 represents the power terminal (not shown) of the operational amplifier in the operational amplifier circuit 40. The output of the operational amplifier circuit 40 represents the output (not shown) of the operational amplifier in the operational amplifier circuit 40.

When the operational amplifier circuit 40 includes a plurality of operational amplifiers, the non-inverting inputs (i.e., "+", not shown in the figure) of the plurality of operational amplifiers in the operational amplifier circuit 40 are integrated together to form the first input; the power terminals of the plurality of operational amplifiers are integrated together to form the power terminal. The inverting inputs (i.e., "−", not shown in the figures) of the plurality of operational amplifiers may be integrated together to form the second input, and the outputs of the plurality of operational amplifiers may be integrated together to form the output. Due to this arrangement, the number of interfaces may be reduced, and the size of the device may be reduced.

It should be noted that when the operational amplifier circuit 40 receives the operating voltage AVDD output by the delay circuit 50, the operational amplifier circuit 40 may be switched to the operating state; when the operational amplifier circuit 40 cannot receive the operating voltage AVDD output by the delay circuit 50, the operational amplifier circuit 40 is switched to a non-enabled state (which is also referred to as a non-operating state).

The delay circuit 50 has various structures, and may include a plurality of switches, such as two switches. The delay circuit 50 may further include two switches and two diodes. The delay circuit 50 may further include two switches, two diodes, one delayer, and the like. The structure of the delay circuit 50 is not particularly limited in the embodiments of the present application.

According to the compensation circuit provided in this embodiment of the present application, the operating state of the operational amplifier circuit may be prolonged by the delay circuit in the first stage. When the delay circuit can stably output the common voltage to the display panel, the delay circuit controls the operational amplifier circuit to stop operation. The time duration of outputting the common voltage to the display panel may be prolonged in the second stage, when the operational amplifier circuit is in the operating state, the delay circuit stops outputting the common voltage to the display panel. Thus, the problem of losing of the common voltage due to instantaneous switching can be reduced, when the compensation circuit is switched between the common voltage compensation method and the polarity inversion method, such that the occurrence of abnormal display image of the display panel may be reduced, and the stability of the compensation circuit may be improved.

Second Embodiment

The delay circuit 50 in the embodiments of the present application is described in detail below.

Figure 4:
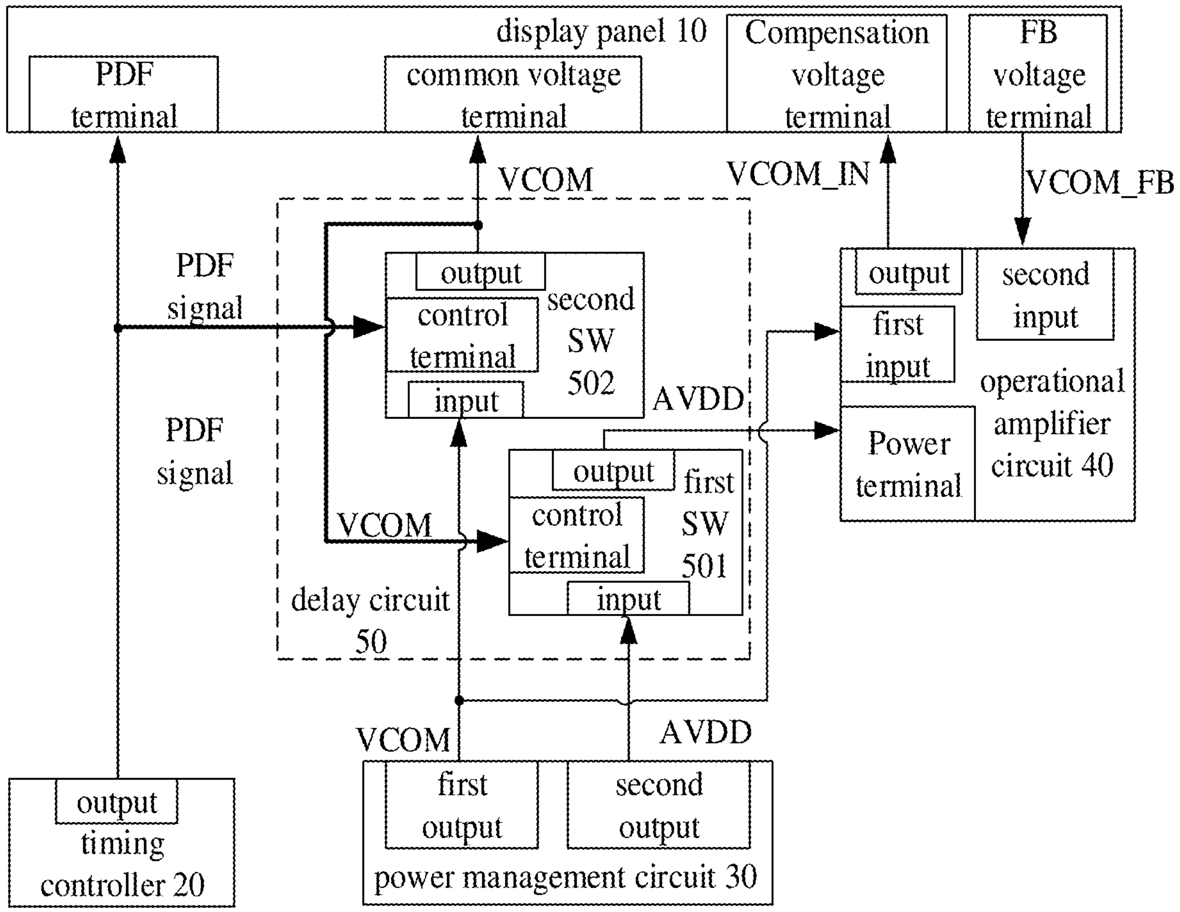
FIG. 4 is a schematic circuit configuration of one compensation circuit having two switches, according to one embodiment of the present application.

As an optional implementation manner, the delay circuit may include two switches, reference can be made to FIG. 4.

FIG. 4 is a schematic circuit configuration of a compensation circuit having two switches according to one embodiment of the present application. As shown in FIG. 4, the compensation circuit includes a timing controller 20, a power management circuit 30, an operational amplifier circuit 40, and a delay circuit 50.

In particular, an output of the timing controller 20 is respectively connected to a PDF terminal of the display panel 10 and a control terminal of the second switch 502, and the timing controller 20 is configured to detect a severity of a display problem of the display panel 10 and output a PDF signal to the display panel 10 and the second switch 502. For example, when the display panel 10 has a common display problem, a low-level PDF signal is output; when the display panel 10 has a special display problem, a high-level PDF signal is output.

An input of the second switch 502 is connected to a first output of the power management circuit 30 and is configured to receive a common voltage VCOM provided by the power management circuit 30; an output of the second switch 502 is respectively connected to a common voltage terminal of the display panel 10 and a control terminal of the first switch 501, and is configured to output the common voltage VCOM to the display panel 10 and the first switch 501, respectively.

An input of the first switch 501 is connected to a second output of the power management circuit 30, and is configured to receive an operating voltage AVDD. An output of the first switch 501 is connected to a power terminal of the operational amplifier circuit 40, and is configured to provide an operating voltage AVDD to the operational amplifier circuit 40.

A first input of the operational amplifier circuit 40 is connected to a first output of the power management circuit 30, and is configured to receive the common voltage VCOM output by the power management circuit 30. A second input of the operational amplifier circuit 40 is connected to a feedback voltage terminal of the display panel 10, and is configured to receive a feedback voltage VCOM_FB provided by the display panel 10. An output of the operational amplifier circuit 40 is connected to a compensating voltage terminal of the display panel 10, and is configured to output a compensating voltage VCOM_IN to the display panel 10.

The first switch 501 and the second switch 502 may be a metal-oxide-semiconductor (Metal-Oxide-Semiconductor, MOS) field effect transistor, and may be a bipolar junction transistor (Bipolar Junction Transistor, BJT), or be also be implemented as an electronic switch, such as a relay. The first switch 501 and the second switch 502 are not limited in the embodiments of the present application. The present application is illustratively described by taking the first switch 501 and the second switch 502 as a MOS transistor as an example hereinafter.

The MOS transistor may be divided into a P-channel metal-oxide-semiconductor (P-channel Metal-Oxide-Semiconductor, PMOS) field effect transistor and an N-channel metal-oxide-semiconductor (N-channel Metal-Oxide-Semiconductor, NMOS) field effect transistor, the PMOS has the characteristics of being turned-on under low level and being turned-off under high level, and the NMOS has the characteristics of conduction under high level and cut-off under low level.

According to the characteristics of the PMOS and the NMOS and the requirements of the circuit, this embodiment is described by taking the first switch 501 in FIG. 4 is the PMOS and taking the second switch 502 in FIG. 4 as the NMOS as an example.

When the first switch 501 is the PMOS and the second switch 502 is the NMOS, a gate electrode (i.e., the control terminal) of the first switch 501 is connected to a source electrode (i.e., the output) of the second switch 502, a source electrode (i.e., the input) of the first switch 501 is connected to a second output of the power management circuit 30, and a drain electrode (i.e., the output) of the first switch 501 is connected to the power terminal of the operational amplifier circuit 40. A gate electrode (i.e., the control terminal) of the second switch 502 is connected to the PDF signal line, a drain electrode (i.e., an input) of the second switch 502 is connected to a first output of the power management circuit 30, and a source electrode (i.e., the output) of the second switch 502 is connected to the display panel 10.

Both the first switch 501 and the second switch 502 have a threshold voltage. For the convenience of illustration, a threshold voltage of the first switch 501 is referred to as a first threshold voltage, and a threshold voltage of the second switch 502 is referred to as a second threshold voltage. The first threshold voltage may be the same as the second threshold voltage; or alternatively, the first threshold value and the second threshold value may not be the same, which is not particularly limited in this embodiment of the present application. This embodiment is described by taking the first threshold voltage being different from the second threshold voltage as an example hereinafter.

In this embodiment, the first threshold voltage is greater than 0 and is less than the common voltage VCOM. When the first switch receives the common voltage VCOM, the first switch 501 is turned-off. When the first switch 501 does not receive the common voltage VCOM, the first switch 501 is turned-on. The second threshold voltage is less than a high level voltage of the PDF signal and is greater than a low level voltage of the PDF signal. When the PDF signal is a low level signal, the second switch 502 is turned-off, when the PDF signal is a high level signal, the second switch 502 is turned-on.

The working principle of the compensation circuit provided in FIG. 4 is described below with reference to FIG. 4.

When the timing controller 20 detects that the display problem of the display panel 10 is a special display problem, the PDF signal in the timing controller 20 is at a high level, and the high-level PDF signal is input to the display panel 10 and the second switch 502. It is noted that, the high level PDF signal indicates that the display problem is the special display problem which can only be solved by changing the driving mode of the liquid crystals in the display panel 10.

In particular, since the second switch 502 is the NMOS and has the characteristics of conduction under high level and cut-off under low level, thus, when the PDF signal is at a high level, in the first phase, the second switch 502 is turned-on, and the second switch 502 outputs the common voltage VCOM to the display panel 10. In the first sub-stage, the second switch 502 just receives the high-level PDF signal and starts to be turned-on stage (i.e., the delay circuit is in a start-up phase), and the common voltage VCOM output by the second switch 502 in this stage is also unstable. In the second sub-stage, the second switch 502 has been able to stably and continuously receive the high-level PDF signal, and is in a fully turned-on stage (i.e., the delay circuit 50 is in a stable phase), and the second switch 502 in this stage can output a stable common voltage VCOM.

Since the first switch 501 is the PMOS and has the characteristics of being turned-on under low level and being turned-off under high level, and in order to reduce the loss to the first switch 501 due to unstable voltage, the first switch 501 cannot be disconnected by the unstable common voltage VCOM in the first sub-stage, the first switch 501 continues to be in the turned-on state, and thus the first switch 501 outputs the operating voltage AVDD to the operational amplifier circuit 40. In the second sub-stage, the stable common voltage VCOM may control the first switch 501 to be turned-off, and the first switch 501 stops outputting the operating voltage AVDD to the operational amplifier circuit.

Since the operational amplifier circuit 40 can receive the operating voltage AVDD output by the first switch 501 in the first stage, thus, the operational amplifier circuit 40 is still in an operating state in the first sub-stage. In the second sub-stage, since the operational amplifier circuit 40 cannot receive the operating voltage AVDD output by the first switch 501, the operational amplifier circuit 40 switches to a non-enabled state in the second sub-stage, and thus stops receiving the common voltage VCOM output by the power management circuit 30, stops receiving the feedback voltage VCOM_FB output by the display panel 10, and stops outputting the compensating voltage VCOM_IN to the display panel 10.

When the timing controller 20 detects that the display problem of the display panel 10 is a common display problem, the PDF signal in the timing controller 20 is at a low level, and the low level PDF signal is input to the display panel 10 and the second switch 502, which indicates that the display problem is the common display problem, and it only needs to compensate the common voltage VCOM to solve the common display problem.

In particular, it can be known from the descriptions mentioned above that when the PDF signal is at a low level, the second switch 502 is turned-off, and the second switch 502 stops outputting the common voltage VCOM to the display panel 10 in the second stage; in the third sub-stage, the second switch 502 just receives the low-level PDF signal and starts to be in a turned-off stage, and the common voltage VCOM output by the second switch 502 is not completely cut off in this stage. In the fourth sub-stage, the second switch 502 has been able to stably and continuously receive the low-level PDF signal, and is in a fully turned-off stage, the output common voltage VCOM has been completely cut off.

In the third sub-stage, the common voltage VCOM is not completely cut off, and the first switch 501 may also receive the common voltage VCOM. Thus, the first switch 501 is kept in a turned-off state, and stops outputting the operating voltage AVDD to the operational amplifier circuit 40, the operational amplifier circuit 40 is in a non-operating state. In the fourth sub-stage, the common voltage VCOM is completely cut off, the first switch 501 cannot receive the common voltage VCOM, thus, the first switch 501 is turned-on, and starts to output the operating voltage to the operational amplifier circuit 40, the operational amplifier circuit 40 is in an operating state. The operational amplifier circuit 40 in the operating state may receive the common voltage VCOM provided by the power management circuit 30 and the feedback voltage VCOM_FB provided by the display panel 10, and then determine a compensation coefficient according to a ratio of an internal feedback resistance to an input resistance, and output the compensating voltage VCOM_IN to the display panel 10 according to the compensation coefficient, in order to compensate the common voltage in the display panel 10, thereby solving the display problem of the display panel 10.

It needs be noted that at least one of the feedback resistance and the input resistance in the operational amplifier circuit 40 is a variable resistor, so as to improve the flexibility of compensation of the operational amplifier circuit 40.

The compensation circuit provided in this embodiment of the present application may enable the second switch to be turned-on when the PDF is a high-level signal, and continue to provide the common voltage VCOM to the display panel, thereby overcoming the problem of failure of displaying caused due to the fact that the display panel cannot receive the common voltage since compensation operation on the common voltage VCOM is completely stopped. Furthermore, the problem of losing of the common voltage caused due to simultaneous switching between the DC-type common voltage VCOM and the AC-type compensating voltage VCOM_IN when the PDF function is enabled or disabled may be reduced. Thus, the occurrence of abnormal display image of the display panel may be reduced, and the stability of the compensation circuit may be further improved.

Third Embodiment

Figure 5:
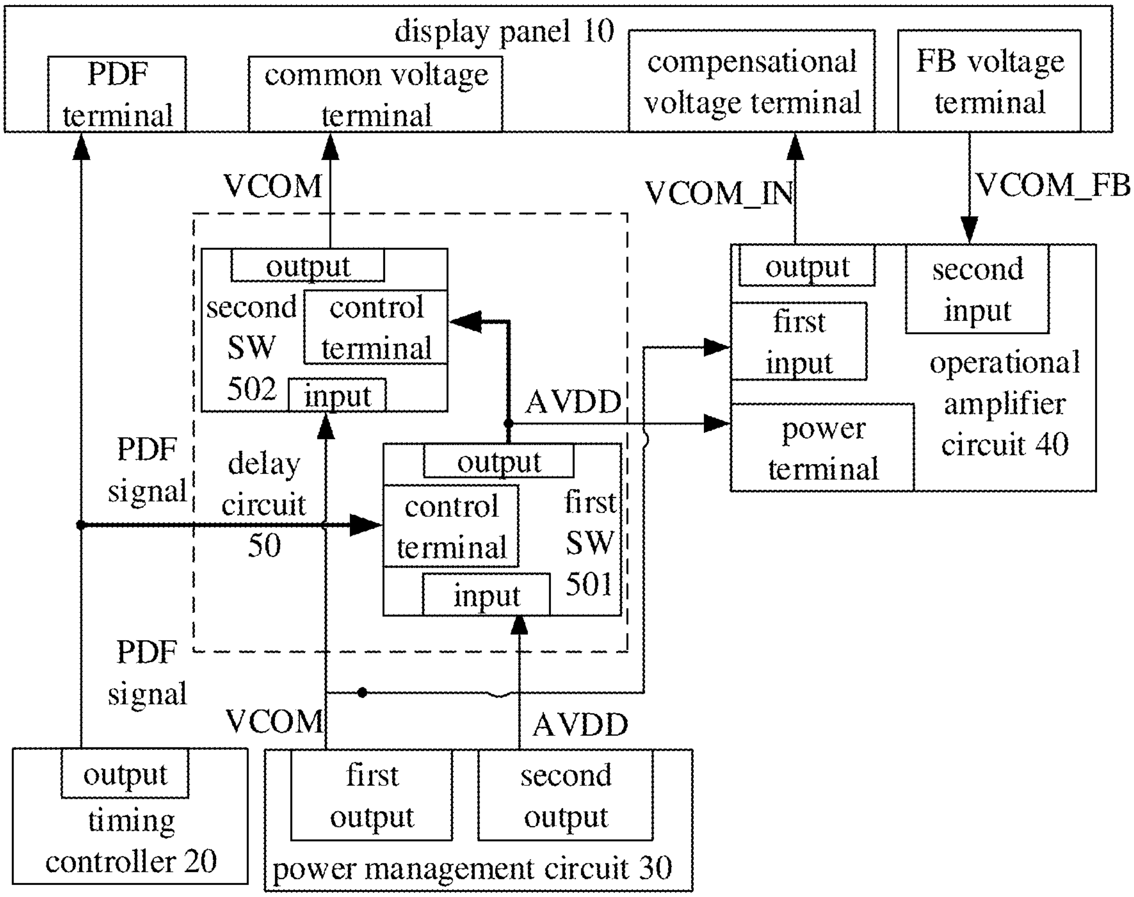
FIG. 5 is a schematic circuit configuration of another compensation circuit having two switches, according to one embodiment of the present application.

As another optional embodiment, when the delay circuit 50 includes two switches, there may be other connection relationship, regarding the connection relationship, reference can be made to FIG. 5.

FIG. 5 is a schematic circuit configuration of another compensation circuit having two switches according to one embodiment of the present application. As shown in FIG. 5, the delay circuit 50 includes a first switch 501 and a second switch 502. The difference between the delay circuit 50 shown in FIG. 5 and the compensation circuit shown in FIG. 4 is that the connection relationships and the functions of the first switch 501 and the second switch 502 are different.

In particular, an output of the timing controller 20 is connected to a PDF terminal of the display panel 10, and is connected to a control terminal of the first switch 501. The timing controller 20 is configured to detect a severity of a display problem of the display panel 10, and output the PDF signal to the display panel 10 and the first switch 501. For example, when the display panel 10 has a common display problem, a low-level PDF signal is output; when the display panel 10 has a special display problem, a high-level PDF signal is output.

An input of the first switch 501 is connected to a second output of the power management circuit 30 and is configured to receive an operating voltage AVDD provided by the power management circuit 30. An output of the first switch 501 is respectively connected to a power terminal of the operational amplifier circuit 40 and a control terminal of the second switch 502, and is configured to provide an operating voltage AVDD to the operational amplifier circuit 40 and the second switch 502, respectively.

An input of the second switch 502 is connected to a first output of the power management circuit 30 and is configured to receive a common voltage VCOM provided by the power management circuit 30. An output of the second switch 502 is connected to a common voltage terminal of the display panel 10, and is configured to output the common voltage VCOM to the display panel 10.

A first input of the operational amplifier circuit 40 is connected to a first output of the power management circuit 30, and is configured to receive the common voltage VCOM provided by the power management circuit 30. A second input of the operational amplifier circuit 40 is connected to a feedback voltage terminal of the display panel 10, and is configured to receive a feedback voltage VCOM_FB provided by the display panel 10. An output of the operational amplifier circuit 40 is connected to a compensating voltage terminal of the display panel 10, and is configured to output a compensating voltage VCOM_IN to the display panel 10.

According to the characteristics of the PMOS and the NMOS and the requirements of the circuit, this embodiment is described by taking the first switch 501 and the second switch 502 in FIG. 5 as the PMOS as an example.

When the first switch 501 and the second switch 502 are the PMOS, the gate electrode (i.e., the control terminal) of the first switch 501 is connected to the PDF signal line, the source electrode (i.e., the input) of the first switch 501 is connected to the second output of the power management circuit 30, the drain electrode (i.e., the output) of the first switch 501 is connected to the gate electrode (i.e., the control terminal) of the second switch 502, the source electrode (i.e., the input) of the second switch 502 is connected to the first output of the power management circuit 30, and the drain electrode (i.e., the output) of the second switch 502 is connected to the display panel 10.

The first threshold voltage is greater than a low level voltage of the PDF signal, and is less than the high level voltage of the PDF signal, when the PDF signal is a low-level signal, the first switch 501 is turned-on; when the PDF signal is a high-level signal, the first switch 501 is turned-off. The second threshold voltage is greater than 0 and is less than the operating voltage AVDD. When the second switch can receive the operating voltage AVDD, the second switch 502 is turned-off; when the second switch cannot receive the operating voltage AVDD, the second switch 502 is turned-on.

The working principle of the compensation circuit provided in FIG. 5 is described below with reference to FIG. 5.

When the timing controller 20 detects that the display problem of the display panel 10 is a common display problem, the PDF signal in the timing controller 20 is at a low level, and the low level PDF signal is input to the display panel 10 and the first switch 501. In this condition, the low level PDF signal indicates that the display problem is a common display problem, and it only needs to compensate the VCOM to solve the display problem.

In particular, since the first switch 501 is a PMOS and has the characteristics of being turned-on under low level and being turned-off under high level, thus, when the PDF signal is at a low level, in the second phase, the first switch 501 is turned-on, and thus the first switch 501 outputs the operating voltage AVDD to the operational amplifier circuit 40. In the third sub-stage, the first switch 501 just receives the low-level PDF signal and is in a start-to be-turned-on phase (i.e., the delay circuit is in the startup phase), and the operating voltage AVDD output by the first switch 501 in this stage is also unstable. In the fourth sub-stage, the first switch 501 has been able to stably and continuously receive the low-level PDF signal, and is in a fully turned-on phase (i.e., the delay circuit 50 is in a stable phase), and the first switch 501 can stably output the operating voltage AVDD in this stage.

Since the second switch 502 is also a PMOS and has the same characteristics as the first switch 501, and the loss of the second switch 502 caused due to unstable voltage needs to be reduced, in the third sub-stage, the unstable operating voltage AVDD cannot turn off the second switch 502, the second switch 502 continues to be in the turned-on phase, and the second switch 502 outputs the common voltage VCOM to the display panel 10. In the fourth sub-stage, the stable operating voltage AVDD can control the second switch 502 to be turned-off, the second switch 502 stops outputting the common voltage VCOM to the display panel 10.

Since the operational amplifier circuit 40 can receive the operating voltage AVDD output by the first switch 501 in the second stage, thus, the operational amplifier circuit 40 is in an operating state in the second stage, and the operational amplifier circuit 40 being in the operating state can receive the common voltage VCOM provided by the power management circuit 30 and the feedback voltage VCOM_FB provided by the display panel 10, and then determine a compensation coefficient according to a ratio of an internal feedback resistance to an input resistance, and output the compensating voltage VCOM_IN to the display panel 10 according to the compensation coefficient subsequently to compensate the common voltage in the display panel 10, thereby solving the display problem of the display panel 10.

When the timing controller 20 detects that the display problem of the display panel 10 is a special display problem, the PDF signal in the timing controller 20 is at a high level, the high-level PDF signal is input to the display panel 10 and the first switch 501, which indicates that the display problem is a special display problem, and this special display problem needs to be solved by changing the display problem of the driving mode of the liquid crystals in the display panel 10.

In particular, it may be known from the aforesaid descriptions that when the PDF signal is at a high level, in the first stage, the first switch 501 is turned-off, and the first switch 501 stops outputting the operating voltage AVDD to the operational amplifier circuit 40. In the first sub-stage, the first switch 501 just receives the high-level PDF signal and starts to be in a turned-off stage, and the operating voltage AVDD output by the first switch 501 is not completely cut off in this stage. In the second sub-stage, the first switch 501 has been able to stably and continuously receive the high-level PDF signal, and is in the fully turned-off stage, the output operating voltage AVDD has been completely cut off.

In the first sub-stage, the operating voltage AVDD is not completely cut off, and the second switch 502 can still receive the operating voltage AVDD. Thus, the second switch 502 remains in the turned-on state and continues to output the common voltage VCOM to the display panel 10. In the second sub-stage, the operating voltage AVDD has been completely cut off, and the second switch 502 cannot receive the operating voltage AVDD. Thus, the second switch 502 is turned-off, and the second switch 502 stops outputting the common voltage VCOM to the display panel 10.

The compensation circuit provided in this embodiment of the present application may enable the first switch to be turned-off when the PDF signal is a high-level signal, compensation on the common voltage VCOM is stopped, and power consumption of the compensation circuit is reduced. In addition, under the action of the first switch, the second switch may further continue to provide the common voltage VCOM to the display panel, thereby overcoming the problem of failure of displaying caused due to the fact that the display panel cannot receive the common voltage VCOM, since compensation on the common voltage VCOM is completely stopped. In the third aspect, the problem of loss of the common voltage caused due to the simultaneous switching of the DC-type common voltage VCOM and the AC-type compensating voltage VCOM_IN when the PDF function is enabled or disabled may be reduced. Thus, the occurrence of abnormal display image of the display panel may be reduced, and the stability of the compensation circuit may be further improved.

Fourth Embodiment

Figure 6:
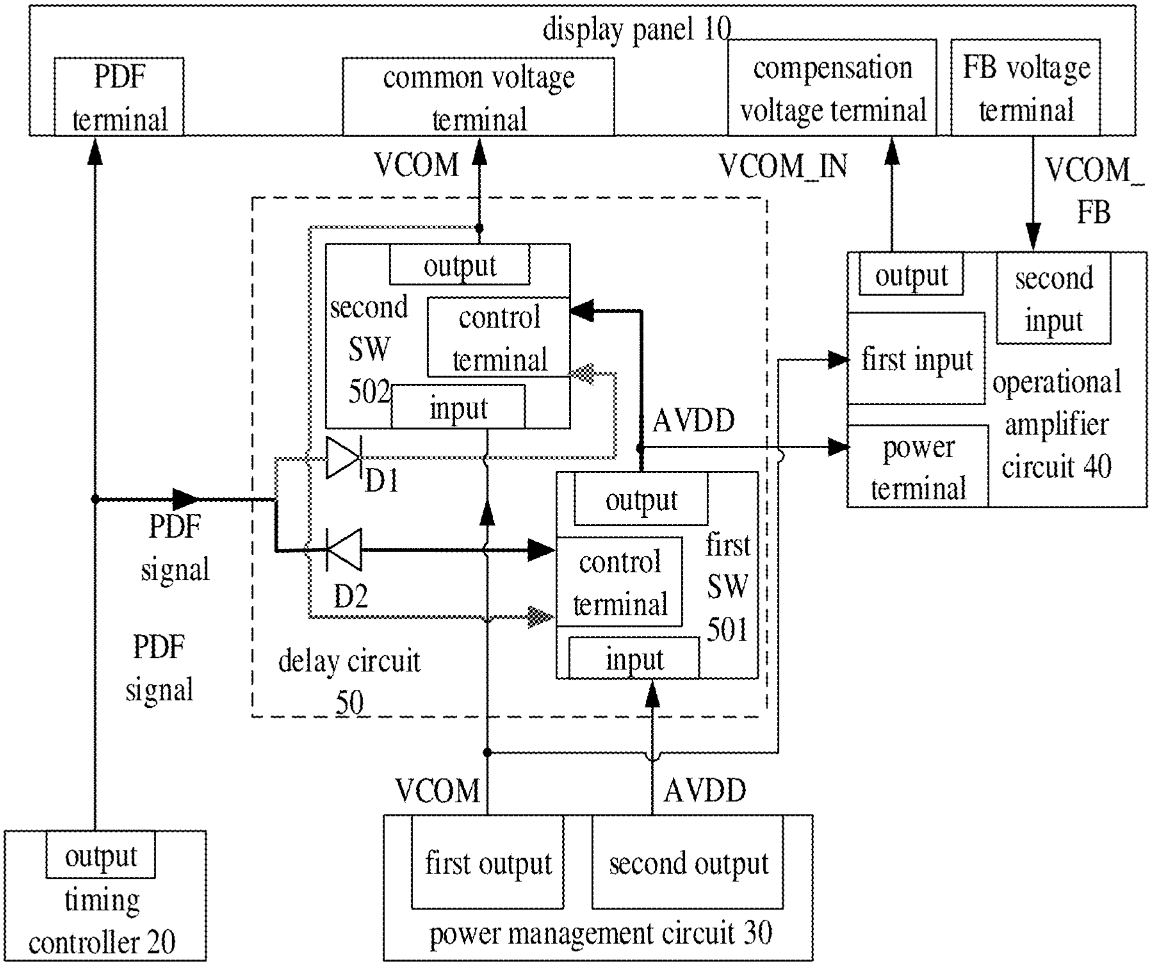
FIG. 6 is a schematic circuit configuration of a compensation circuit having two switches and two diodes, according to one embodiment of the present application.

In order to prevent reverse flow of the current from damaging the circuit, as another optional embodiment, the present application provides a schematic circuit configuration of a compensation circuit including two switches and two diodes, regarding the circuit configuration of the compensation circuit, reference can be made to FIG. 6.

FIG. 6 is a schematic circuit configuration of a compensation circuit including two switches and two diodes according to one embodiment of the present application, as shown in FIG. 6, the delay circuit includes a first switch 501, a second switch 502, a first diode D1, and a second diode D2.

In particular, an output of the timing controller 20 is connected to a control terminal of the second switch 502 through the first diode D1, and is connected to the control terminal of the first switch 501 through the second diode D2. The output of the timing controller 20 is further connected to the PDF terminal of the display panel 10. The timing controller 20 is configured to detect a severity of a display problem of the display panel 10, and output a PDF signal to the display panel 10, the first switch 501 and the second switch 502. For example, when the display panel 10 has a common display problem, a low-level PDF signal is output; when the display panel 10 has a special display problem, a high-level PDF signal is output.

The control terminal of the first switch 501 is further connected to the output of the second switch 502, and is configured to receive the common voltage VCOM output by the second switch 502. The input of the first switch 501 is connected to the second output of the power management circuit 30, and is configured to receive the operating voltage AVDD output by the power management circuit 30. The output of the first switch 501 is connected to the control terminal of the second switch 502 and the power terminal of the operational amplifier circuit 40 respectively, and is configured to output the operating voltage AVDD.

An output of the second switch 502 is further connected to a common voltage terminal of the display panel 10, and is configured to output the common voltage VCOM to the display panel 10. An input of the second switch 502 is connected to a first output of the power management circuit 30, and is configured to receive the common voltage VCOM output by the power management circuit 30.

A first input of the operational amplifier circuit 40 is connected to a first output of the power management circuit 30, and is configured to receive the common voltage VCOM provided by the power management circuit 30. A second input of the operational amplifier circuit 40 is connected to a feedback voltage terminal of the display panel 10, and is configured to receive a feedback voltage VCOM_FB provided by the display panel 10. An output of the operational amplifier circuit 40 is connected to a compensating voltage terminal of the display panel 10, and is configured to output a compensating voltage VCOM_IN to the display panel 10.

According to the characteristics of the PMOS and the NMOS and the requirements of the circuit, this embodiment is described by taking the first switch 501 and the second switch 502 in FIG. 6 as the PMOS as an example.

When the first switch 501 and the second switch 502 are the PMOS, a gate electrode (i.e., the control terminal) of the first switch 501 is connected to an anode of the second diode D2 and a drain electrode (i.e., the output) of the second switch 502, a source electrode (i.e., the input) of the first switch 501 is connected to the second output of the power management circuit 30, and a drain electrode (i.e., the output) of the first switch 501 is connected to the power terminal of the operational amplifier circuit 40 and the gate electrode (i.e., the control terminal) of the second switch 502, respectively. A gate electrode (i.e., the control terminal) of the second switch 502 is further connected to a cathode of the first diode D1, a source electrode (i.e., the input) of the second switch 502 is connected to a first output of the power management circuit 30, and a drain electrode (i.e., the output) of the second switch 502 is further connected to the display panel 10.

The first threshold voltage is greater than a low level voltage of the PDF signal and is less than a common voltage VCOM. When the PDF signal is a low-level signal, the first switch 501 is turned-on, when the first switch 501 can receive the common voltage VCOM, the first switch 501 is turned-off. The second threshold voltage is greater than the high-level voltage of the PDF signal and is less than the operating voltage AVDD, when the second switch 502 can receive the operating voltage AVDD, the second switch 502 is turned-off, when the second switch 502 can receive the high-level PDF signal, the second switch 502 is turned-on.

It should be noted that the low-level PDF signal in this embodiment of the present application is a negative voltage, and may be −4 volts (V), or be 3V, or the like, which is not particularly limited in the embodiments of the present application. The present application is illustratively described by taking the low level PDF signal as −4V as an example. A high-level PDF signal is a positive voltage, and may be an opposite number of the voltage of the low-level PDF signal, such as 4V, 3V, and the like. As an alternative, the high level PDF signal may not be an opposite number of the voltage of the low level PDF signal, such as 1V, 2V, etc., which is not particularly limited in the embodiments of the present application. The present application is illustratively described by taking the high level PDF signal is the opposite number (i.e., 4V) of the voltage of the lower level PDF signal as an example. The common voltage VCOM is a positive voltage being greater than the high level PDF signal, the present application is illustratively described by taking the voltage value of the common voltage VCOM as 5V as an example. The operating voltage AVDD is a positive voltage greater than the common voltage VCOM, the present application is illustratively described hereinafter by taking the operating voltage AVDD as 10 V as an example.

The working principle of the compensation circuit provided in FIG. 6 is described below with reference to FIG. 7 and FIG. 8.

Figure 7:
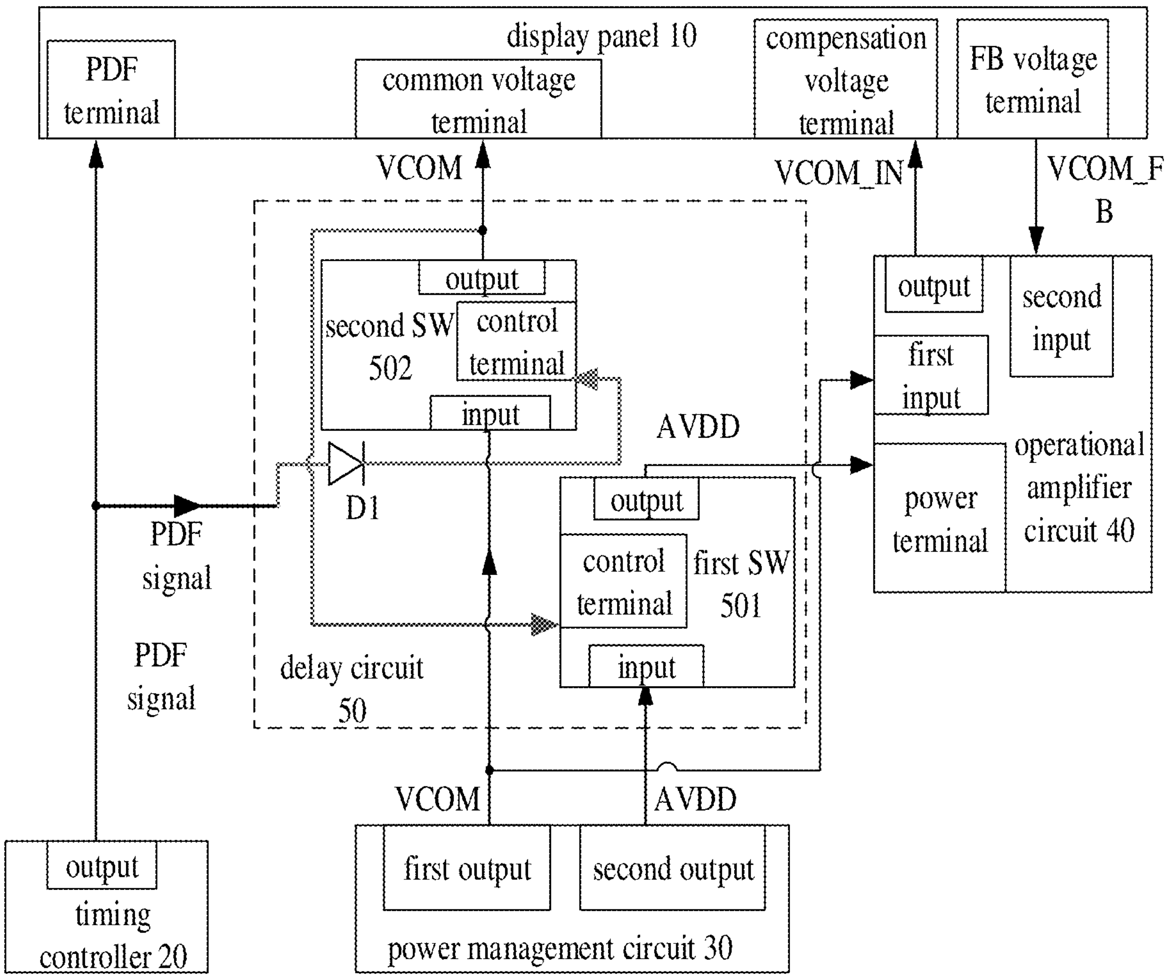
FIG. 7 is a schematic diagram of conduction condition of the compensation circuit in FIG. 6 in the case of a high-level PDF signal, according to one embodiment of the present application.

FIG. 7 is a schematic diagram of a conduction condition of the compensation circuit of FIG. 6 in the case of a high-level PDF signal according to one embodiment of the present application. As shown in FIG. 7, when the timing controller 20 detects that the display problem of the display panel 10 is a special display problem, the PDF signal in the timing controller 20 is at a high level, the high-level PDF signal is input to the display panel 10, the high level PDF signal is input to the second switch 502 through the first diode D1. In this condition, it indicates that the display problem is a special display problem, and this special display problem can only be solved by changing the driving mode of the liquid crystals in the display panel 10.

In particular, since the second switch 502 is the PMOS and has the characteristics of being turned-on under low level and being turned-off under high level, when the PDF signal is at a high level, in the first stage, the first diode D1 is turned-on, the second switch 502 is turned-on, and the second switch 502 outputs the common voltage VCOM to the display panel 10. In the first sub-stage, the second switch 502 just receives the high-level PDF signal and starts to be in the turned-on phase (i.e., the delay circuit is in the start-up phase), and the common voltage VCOM output by the second switch 502 is unstable in this stage. In the second sub-stage, the second switch 502 has been able to stably and continuously receive the high-level PDF signal, and is in a fully turned-on phase (i.e., the delay circuit 50 is in a stable phase), and thus the second switch 502 can output a stable common voltage VCOM in this stage.

Since the first switch 501 is the PMOS and has the characteristics of being turned-on under low level and being turned-off under high level, and in order to reduce the loss of the first switch 501 caused due to unstable voltage, the first switch 501 cannot be turned off by unstable common voltage VCOM in the first sub-stage, the first switch 501 continues to be in the turned-on phase, and outputs the operating voltage AVDD to the operational amplifier circuit 40. In the second sub-stage, the stable common voltage VCOM may control the first switch 501 to be turned-off, and thus the first switch 501 stops outputting the operating voltage AVDD to the operational amplifier circuit.

Since the operational amplifier circuit 40 may receive the operating voltage AVDD output by the first switch 501 in the first sub-stage, the operational amplifier circuit 40 is still in an operating state in the first sub-stage. In the second sub-stage, the operational amplifier circuit 40 cannot receive the operating voltage AVDD output by the first switch 501. Thus, the operational amplifier circuit 40 switches to an inactivated state in the second sub-stage, stops receiving the common voltage VCOM output by the power management circuit 30, stops receiving the feedback voltage VCOM_FB output by the display panel 10, and stops outputting the compensating voltage VCOM_IN to the display panel 10.

Figure 8:
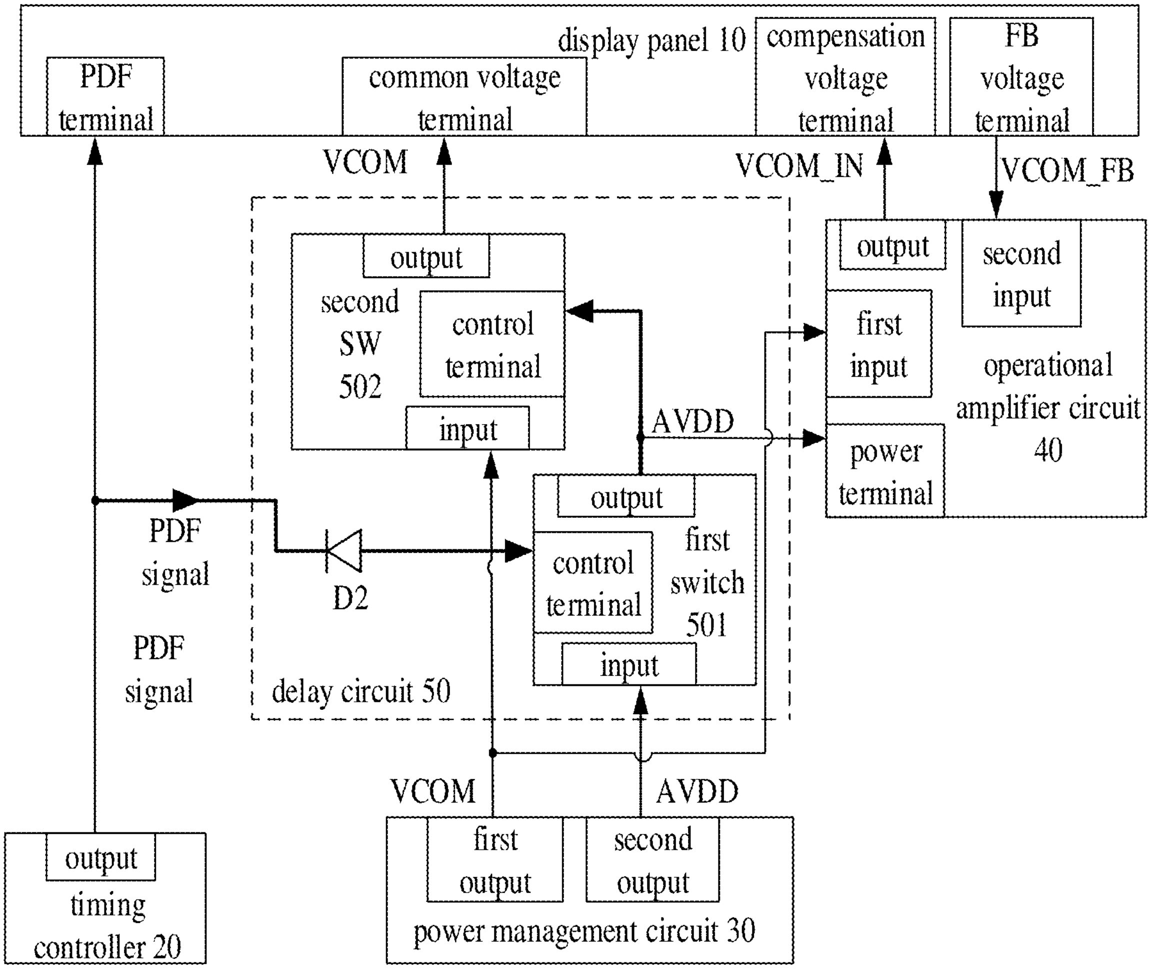
FIG. 8 is a schematic diagram of conduction condition of the compensation circuit in FIG. 6 in the case of a low-level PDF signal, according to one embodiment of the present application.

FIG. 8 is a schematic diagram of the conduction condition of the compensation circuit of FIG. 6 in the case of a low-level PDF signal according to one embodiment of the present application. As shown in FIG. 8, when the timing controller 20 detects that the display problem of the display panel 10 is a common display problem, the PDF signal in the timing controller 20 is at a low level, the low-level PDF signal is input to the display panel 10, and the low-level PDF signal is input to the first switch 501 through the second diode D2. In this condition, it indicates that the display problem is a special display problem, and this special display problem can only be solved by changing the driving mode of the liquid crystals in the display panel 10.

In particular, since the first switch 501 is the PMOS and has the characteristics of being turned-on under low level and being turned-off under high level, when the PDF signal is at a low level, in the second phase, the second diode D2 is turned-on, the first switch 501 is turned-on, and the first switch 501 outputs the operating voltage AVDD to the operational amplifier circuit 40. In the third sub-stage, the first switch 501 just receives the low-level PDF signal and starts to be in the turned-on phase (i.e., the delay circuit is in the startup phase), and the operating voltage AVDD output by the first switch 501 is unstable in this stage. In the fourth sub-stage, the first switch 501 has been able to stably and continuously receive the low-level PDF signal, and is in a fully turned-on phase (i.e., the delay circuit 50 is in a stable phase), and the first switch 501 may stably output the operating voltage AVDD in this stage.

Since the second switch 502 is also a PMOS and has the same characteristics of the first switch 501, and the loss of the second switch 502 caused by unstable voltage needs to be reduced, in the third sub-stage, the unstable operating voltage AVDD cannot turn off the second switch 502, the second switch 502 continues to be in the turned-on phase, and thus the second switch 502 outputs the common voltage VCOM to the display panel 10. In the fourth sub-stage, the stable operating voltage AVDD may control the second switch 502 to be turned-off, and thus the second switch 502 stops outputting the common voltage VCOM to the display panel 10.

Since the operational amplifier circuit 40 may receive the operating voltage AVDD output by the first switch 501 in the second stage, thus, the operational amplifier circuit 40 is still in the operating state in the second stage. The operational amplifier circuit 40 in the operating state may receive the common voltage VCOM provided by the power management circuit 30 and the feedback voltage VCOM_FB provided by the display panel 10 in the second stage, and then determine a compensation coefficient according to a ratio of an internal feedback resistance to an input resistance, and output the compensating voltage VCOM_IN to the display panel 10 according to the compensation coefficient subsequently to compensate the common voltage in the display panel 10, thereby solving the display problem of the display panel 10.

The compensation circuit provided in this embodiment of the present application may enable the compensation circuit to stop the compensation on the common voltage VCOM when the PDF is a high-level signal, such that the power consumption of the compensation circuit is reduced. In addition, when the PDF is a high-level signal, the compensation circuit may continue to provide the common voltage VCOM to the display panel, thereby overcoming the problem of failure of displaying due to the fact the display panel cannot receive the common voltage VCOM since the compensation on the common voltage VCOM is completely stopped. In the third aspect, the problem of loss of the common voltage caused due to simultaneous switching between the DC-type common voltage VCOM and the AC-type compensating voltage VCOM_IN when the PDF function is enabled or disabled may be reduced, the occurrence of abnormal display image of the display panel may be reduced, and the stability of the compensation circuit may be further improved.

Fifth Embodiment

In order to make the delay effect to be more obvious, as another optional embodiment, the present application provides a schematic circuit configuration of a compensation circuit including two switches, two diodes, and one delayer. Regarding the compensation circuit, reference can be made to FIG. 9.

Figure 9:
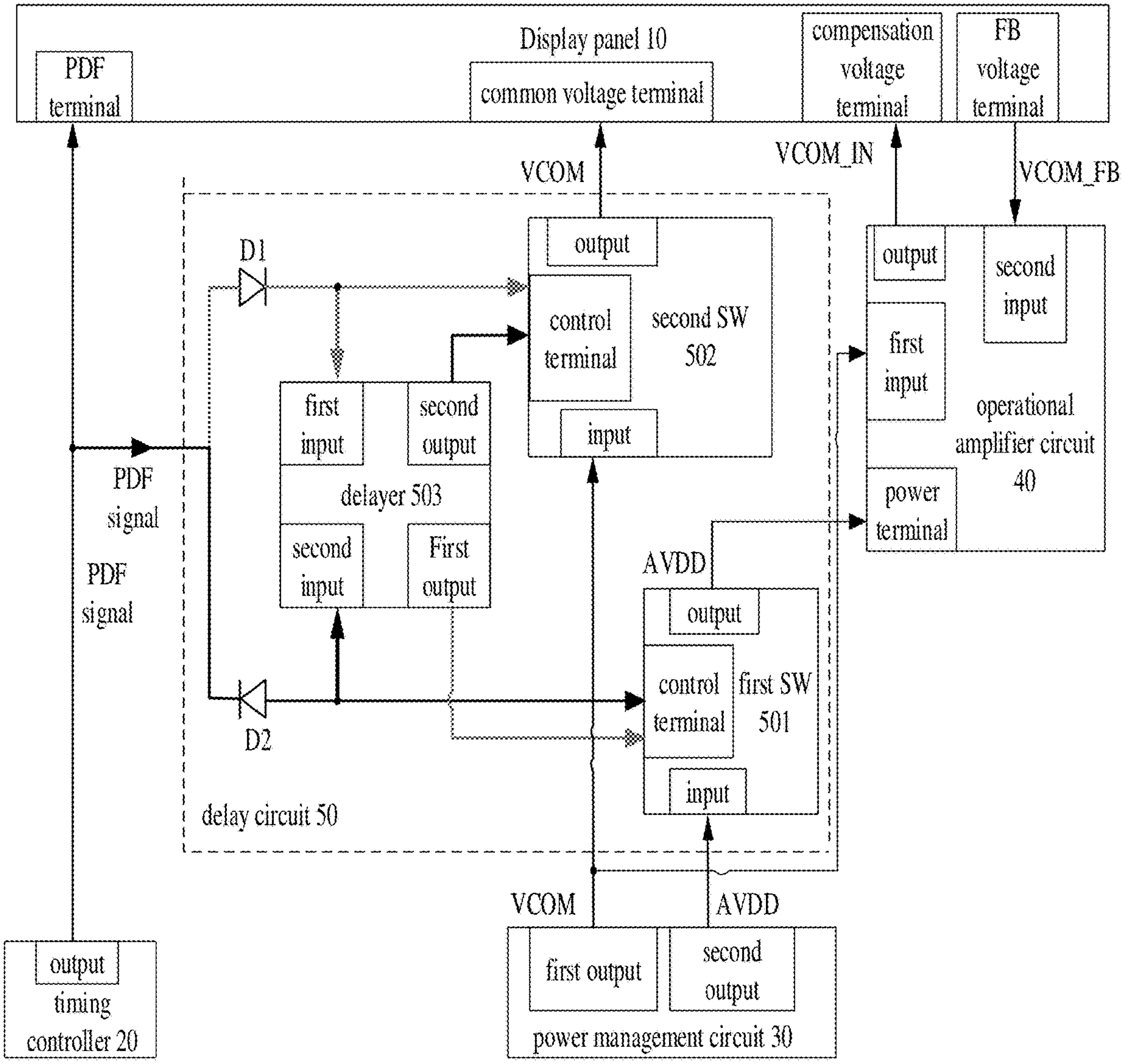
FIG. 9 is a schematic circuit configuration of a compensation circuit having two switches, two diodes and a delayer, according to one embodiment of the present application.

FIG. 9 is a schematic circuit configuration of the compensation circuit including two switches, two diodes, and one delayer according to one embodiment of the present application. As shown in FIG. 9, the delay circuit 50 includes a first switch 501, a second switch 502, a first diode D1, a second diode D2, and a delayer 503.

In particular, an output of the timing controller 20 is respectively connected to a first input of the delayer 503 and a control terminal of the second switch 502 through the first diode D1, and is further connected to a second input of the delayer 503 and a control terminal of the first switch 501 through the second diode D2. The timing controller 20 is further connected to a PDF terminal of the display panel 10. The timing controller 20 is configured to detect a severity of a display problem of the display panel 10, and output a PDF signal to the display panel 10, the first switch 501 and the second switch 502. For example, when the display panel 10 has a common display problem, a low-level PDF signal is output; when the display panel 10 has a special display problem, a high-level PDF signal is output.

A first output of the delayer 503 is connected to a control terminal of the first switch 501, and is configured to output a high-level PDF signal to the first switch 501; a second output of the delayer 503 is connected to a control terminal of the second switch 502, and is configured to output a low-level PDF signal to the second switch 502.

An input of the first switch 501 is connected to a second output of the power management circuit 30, and is configured to receive an operating voltage AVDD output by the power management circuit 30. An output of the first switch 501 is connected to a power terminal of the operational amplifier circuit 40, and is configured to output an operating voltage AVDD to the operational amplifier circuit 40.

An input of the second switch 502 is connected to a first output of the power management circuit 30 and configured to receive a common voltage VCOM output by the power management circuit 30, and an output of the second switch 502 is connected to a common voltage terminal of the display panel 10, and is configured to output a common voltage VCOM to the display panel 10.

A first input of the operational amplifier circuit 40 is connected to a first output of the power management circuit 30, and is configured to receive a common voltage VCOM provided by the power management circuit 30, a second input of the operational amplifier circuit 40 is connected to a feedback voltage terminal of the display panel 10, and is configured to receive a feedback voltage VCOM_FB provided by the display panel 10. An output of the operational amplifier circuit 40 is connected to a compensating voltage terminal of the display panel 10, and is configured to output a compensating voltage VCOM_IN to the display panel 10.

According to the characteristics of the PMOS and the NMOS and the requirements of the circuit, this embodiment is described by taking the first switch 501 in FIG. 9 as a PMOS and taking the second switch 502 in FIG. 9 as a NMOS as an example.

When the first switch 501 is a PMOS and the second switch 502 is a NMOS, a gate electrode (i.e., the control terminal) of the first switch 501 is respectively connected to a first output of the delayer 503 and an anode of the second diode D2, a source electrode (i.e., the input) of the first switch 501 is connected to a second output of the power management circuit 30, and a drain electrode (i.e., the output) of the first switch 501 is connected to a power terminal of the operational amplifier circuit 40. A gate electrode (i.e., the control terminal) of the second switch 502 is respectively connected to a second output of the delayer 503 and a cathode of the first diode D1, and a drain electrode (i.e., the input) of the second switch 502 is connected to a first output of the power management circuit 30, and a source electrode (i.e., the output) of the second switch 502 is connected to the display panel 10.

The first threshold voltage is greater than a low level voltage of the PDF signal and is less than a high level voltage of the PDF signal. When the PDF signal is a low-level signal, the first switch 501 is turned-on, when the PDF signal is a high-level signal, the first switch 501 is turned-off. A second threshold voltage is greater than the low-level voltage of the PDF signal and is less than the high-level voltage of the PDF signal. When the PDF signal is a low-level signal, the second switch 502 is turned-off. When the PDF signal is a high-level signal, the second switch 502 is turned-on.

The working principle of the compensation circuit provided in FIG. 9 is described below with reference to FIG. 10 and FIG. 11.

Figure 10:
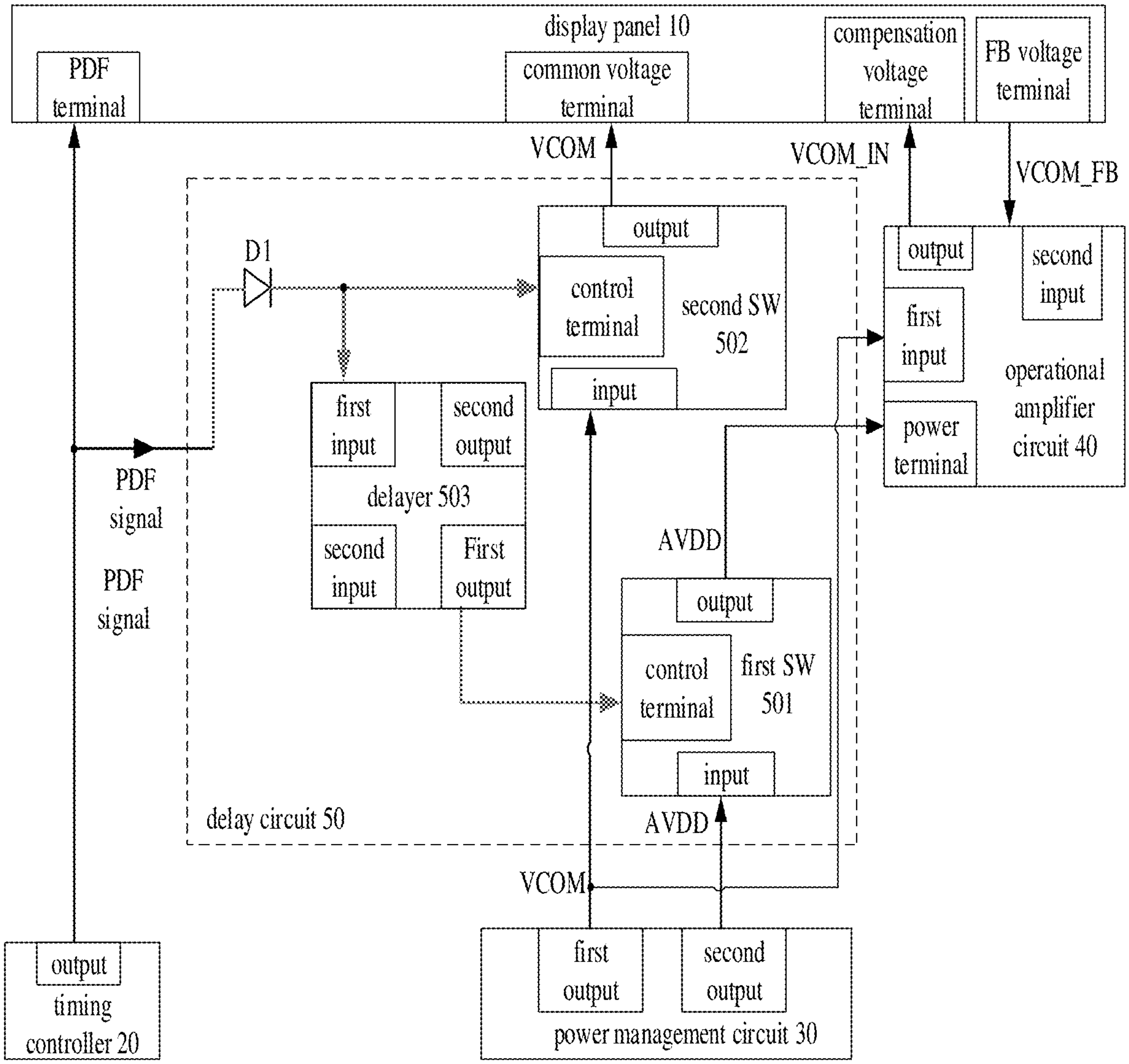
FIG. 10 is a schematic diagram of conduction condition of the compensation circuit in FIG. 9 in the case of a high-level PDF signal, according to one embodiment of the present application.

FIG. 10 is a schematic diagram of a conduction condition of the compensation circuit in FIG. 9 in the case of a high-level PDF signal according to one embodiment of the present application. As shown in FIG. 10, when the timing controller 20 detects that the display problem of the display panel 10 is a special display problem, the PDF signal in the timing controller 20 is at a high level, the high-level PDF signal is input to the display panel 10, and the high level PDF signal is input to the second switch 502 through the first diode D1. In this condition, it indicates that the display problem is a special display problem, and this special display problem can only be solved by changing the driving mode of the liquid crystals in the display panel 10.

In the first stage, since the second switch 502 is a NMOS and has the characteristics of being turned-on under high level and being turned-off under low level, when the PDF signal is at a high level, in the first stage, the first diode D1 is turned-on, the second switch 502 is turned-on, and the second switch 502 outputs the common voltage VCOM to the display panel 10. In the first sub-stage, the delayer 503 performs a delay function, which means that the time at which the high-level PDF signal reaches the first switch 501 may be delayed in this stage (equaling the delayer 503 stopping outputting the high-level PDF signal to the first switch 501), the first switch 501 continues to maintain a turned-on state without receiving the high-level PDF signal, and thus the first switch 501 continues to output the operating voltage AVDD to the operational amplifier circuit 40. In the second sub-stage, the delayer 503 stops performing the delay function, starts to output the high-level PDF signal to the first switch 501 so as to control the first switch 501 to be turned-off, and thus the first switch 501 stops outputting the operating voltage AVDD to the operational amplifier circuit 40.

In the first sub-stage, the operational amplifier circuit 40 may receive the operating voltage AVDD output by the first switch 501. In this stage, the operational amplifier circuit 40 continues to maintain the operating state. In the second sub-stage, the operational amplifier circuit 40 cannot receive the operating voltage AVDD output by the first switch 501, in this stage, the operational amplifier circuit 40 is switched to a non-enabled state, and the operational amplifier circuit 40 in the non-enabled state stops receiving the common voltage VCOM output by the power management circuit 30, stops receiving the feedback voltage VCOM_FB output by the display panel 10, and stops outputting the compensating voltage VCOM_IN to the display panel 10.

Figure 11:
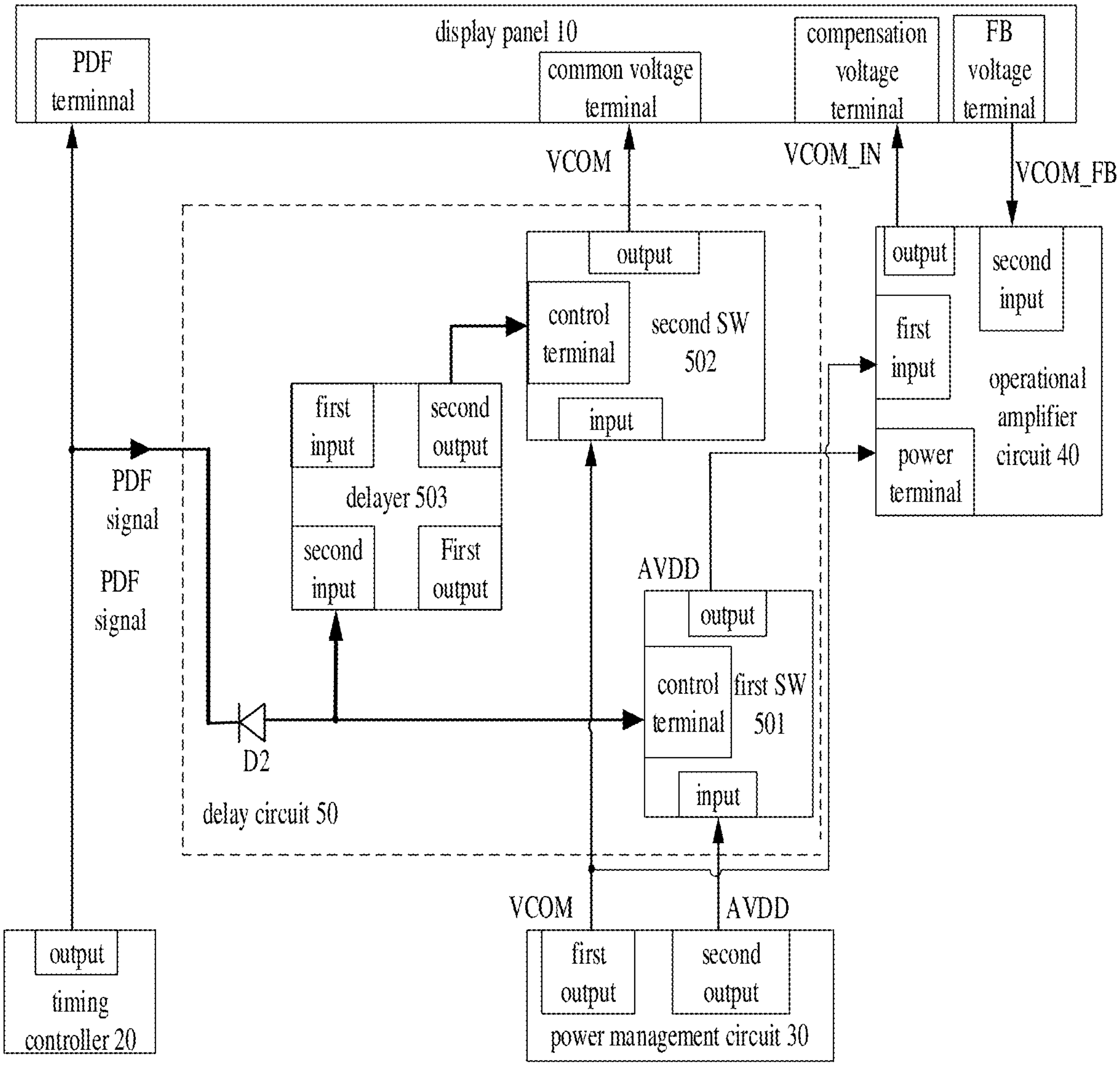
FIG. 11 is a schematic diagram of conduction condition of the compensation circuit in FIG. 9 in the case of a low-level PDF signal, according to one embodiment of the present application.

FIG. 11 is a schematic diagram of the conduction condition of the compensation circuit of FIG. 9 in the case of a low-level PDF signal according to one embodiment of the present application. As shown in FIG. 11, when the timing controller 20 detects that the display problem of the display panel 10 is a common display problem, the PDF signal in the timing controller 20 is at a low level, the low-level PDF signal is input to the display panel 10, and the low-level PDF signal is input to the first switch 501 through the second diode D2. In this condition, it indicates that the display problem is a normal display problem, and this normal display problem can only be solved by changing the driving mode of the liquid crystals in the display panel 10.

In the second phase, since the first switch 501 is a PMOS and has the characteristics of being turned-on under low level and being turned-off under high level, when the PDF signal is at a low level, in the second phase, the second diode D2 is turned-on, the first switch 501 is turned-on, and the first switch 501 outputs the operating voltage AVDD to the operational amplifier circuit 40. In the third sub-stage, the delayer 503 performs the delay function, which means that the time at which the low-level PDF signal reaches the second switch 502 may be delayed (equaling the delayer 503 stopping outputting the low-level PDF signal to the second switch 502) in this stage. The second switch 502 continues to maintain the turned-on state when the low-level PDF signal is not received, and the second switch 502 continues to output the common voltage VCOM to the display panel 10. In the fourth sub-stage, the delayer 503 stops performing the delay function, starts to output the low-level PDF signal to the second switch 502 to control the second switch 502 to be turned-off, and thus the second switch 502 stops outputting the common voltage VCOM to the display panel 10.

In the second stage, the operational amplifier circuit 40 may receive the operating voltage AVDD output by the first switch 501. In this stage, the operational amplifier circuit 40 is switched to the operating state, and the operational amplifier circuit 40 in the operating state may receive the common voltage VCOM provided by the power management circuit 30 and the feedback voltage VCOM_FB provided by the display panel 10, and then determine a compensation coefficient according to a ratio of an internal feedback resistance to an input resistance, and output the compensating voltage VCOM_IN to the display panel 10 according to the compensation coefficient subsequently, so as to compensate the common voltage in the display panel 10, thereby solving the display problem of the display panel 10.

The compensation circuit provided in this embodiment of the present application may enable the compensation circuit to stop the compensation on the common voltage VCOM when the PDF is a high-level signal, such that the power consumption of the compensation circuit is reduced. In addition, when the PDF is a high-level signal, the compensation circuit may continue to provide the common voltage VCOM to the display panel, thereby overcoming the problem of failure of displaying due to the fact the display panel cannot receive the common voltage VCOM since the compensation on the common voltage VCOM is completely stopped. In the third aspect, the problem of loss of the common voltage caused due to simultaneous switching between the DC-type common voltage VCOM and the AC-type compensating voltage VCOM_IN when the PDF function is enabled or disabled may be reduced, the occurrence of abnormal display image of the display panel may be reduced, and the stability of the compensation circuit may be further improved.

A non-target display problem may be divided into a first type of non-target display problem and a second type of non-target display problem, and the first type of non-target display problem is used to indicate that the non-target display problem of the display panel 10 is not serious (i.e., the display panel has a slight defect when displaying). The second type of non-target problem is used to indicate that the non-target display problem occurring in the display panel 10 is very serious. When the display problem is the first type of non-target display problem, compensation on the common voltage VCOM does not need to be performed. When the display problem is the second type of non-target display problem, the compensation on the common voltage VCOM needs to be performed. Therefore, in order to improve the accuracy of compensation to further reduce the power consumption of the compensation circuit when the PDF signal is at a low level, another detection signal, that is, a feedback voltage VCOM_FB is further provided in the embodiment of the present application. A detection priority of the compensation circuit on the PDF signal is higher than a detection priority of the compensation circuit on the feedback voltage VCOM_FB.

A magnitude of the feedback voltage VCOM_FB may reflect whether the non-target display problem occurring in the display panel 10 is the first type of non-target display problem or the second type of non-target problem. That is, when the feedback voltage VCOM_FB is greater than or equal to a target threshold value, it indicates that the non-target display problem occurring in the display panel 10 is the first type of non-target problem. In this condition, the compensation on the common voltage VCOM needs to be performed, the delay circuit 50 does not need to output the common voltage VCOM to the display panel 10. When the feedback voltage VCOM_FB is less than the target threshold value, it indicates that the non-target display problem of the display panel 10 is the second type of non-target problem. In this condition, the compensation on the common voltage VCOM does not need to be performed, the delay circuit 50 needs to output the common voltage VCOM to the display panel 10.

It should be noted that a waveform analysis module (not shown) may be connected to a feedback voltage terminal of the display panel 10, and this waveform analysis module is configured to determine a magnitude of a waveform of the feedback voltage VCOM_FB and a correlation between the waveform of the feedback voltage VCOM_FB and the target threshold. For the convenience of illustration, the feedback voltage VCOM_FB being greater than or equal to the target threshold value is referred to as the first feedback voltage, and the feedback voltage VCOM_FB being less than the target threshold value is referred to as the second feedback voltage hereinafter.

FIGS. 12-19 are schematic circuit configurations of detection of a feedback voltage VCOM_FB in the event that the PDF signal is at a low level.

Sixth Embodiment

Figure 12:
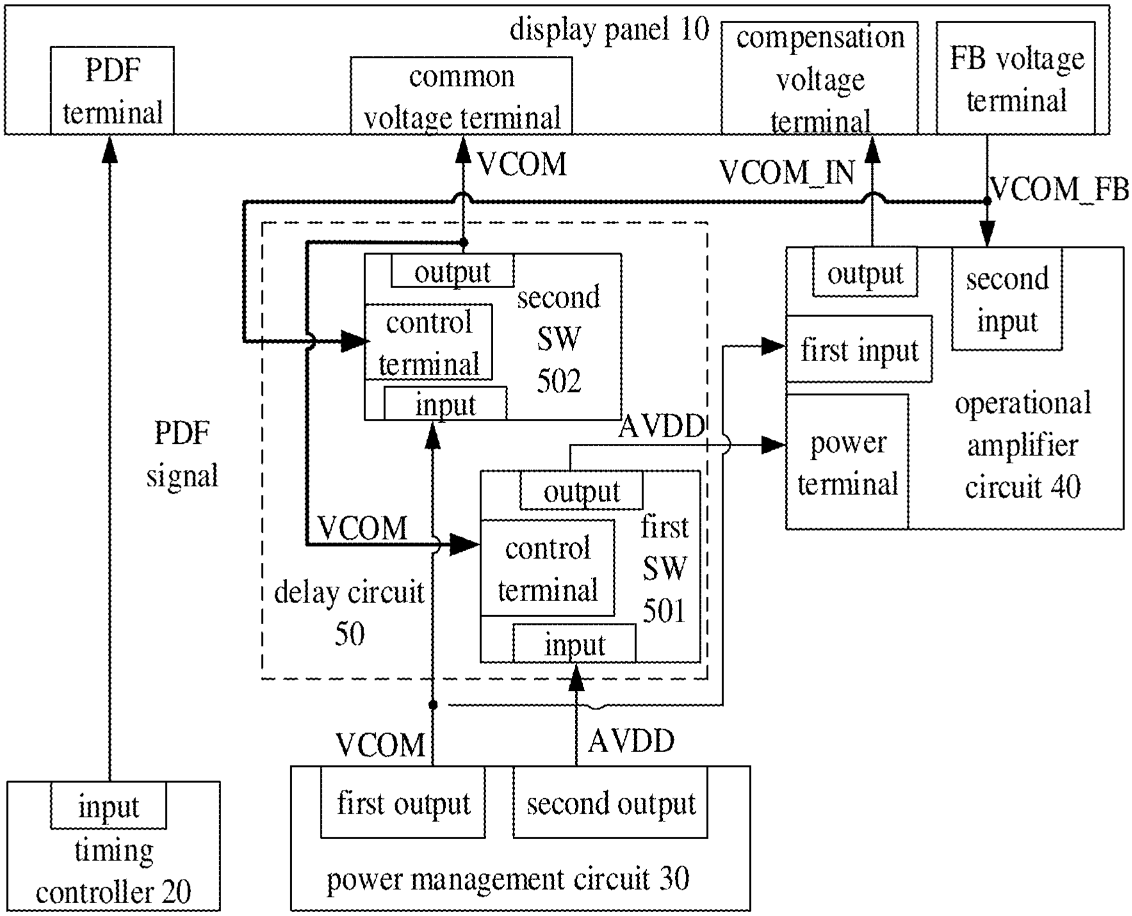
FIG. 12 is a schematic circuit configuration of another compensation circuit having two switches, according to one embodiment of the present application.
Figure 14:
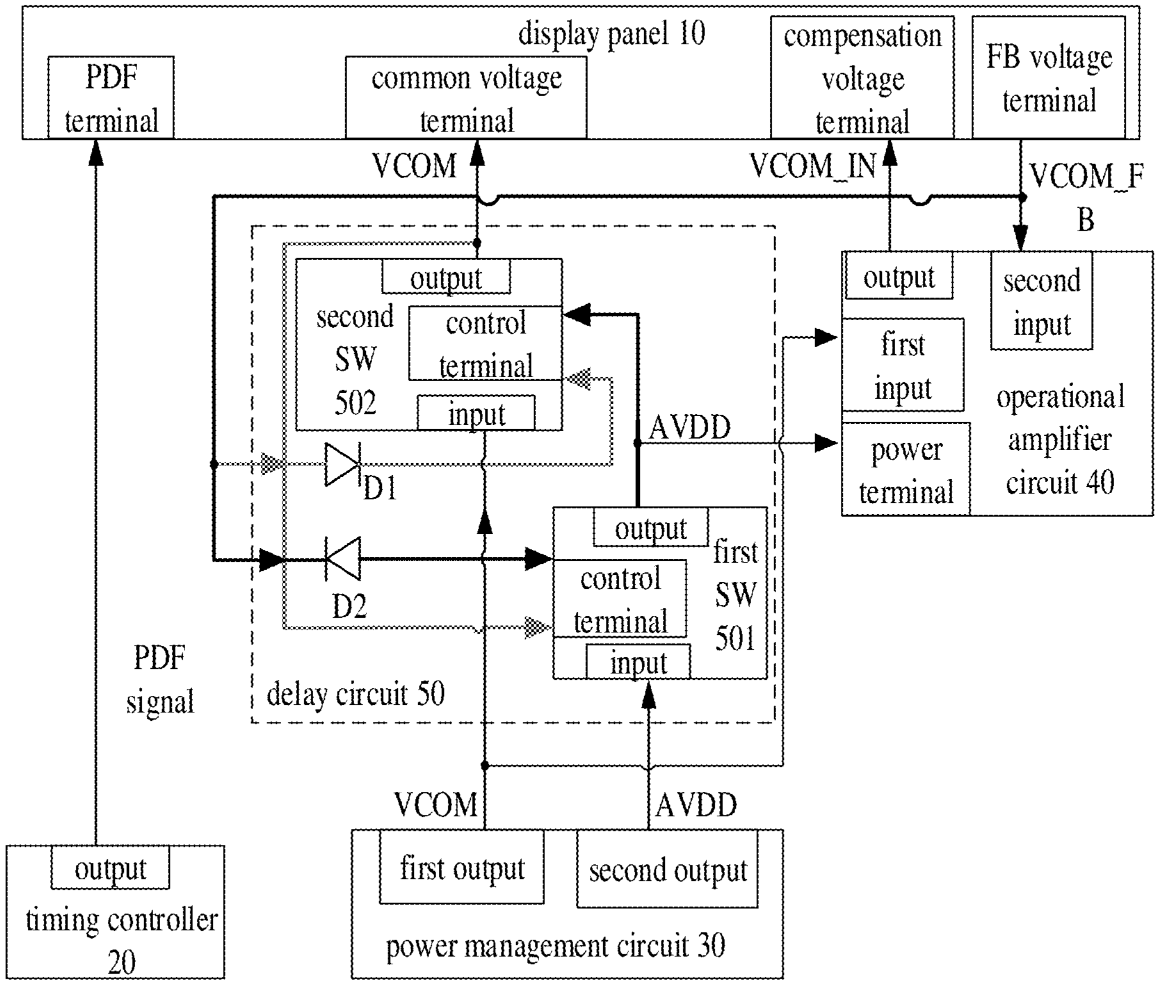
FIG. 14 is a schematic circuit configuration of another compensation circuit having two switches and two diodes, according to one embodiment of the present application.

FIG. 12 is a schematic circuit configuration of another compensation circuit having two switches according to one embodiment of the present application, as shown in FIG. 12, the difference between FIG. 12 and FIG. 4 is that the control signal connected to the control terminal of the second switch 502 in FIG. 12 is different from the control signal connected to the control terminal of the second switch 502 in FIG. 14.

In particular, the compensation circuit includes a timing controller 20, a power management circuit 30, an operational amplifier circuit 40, and a delay circuit 50.

In particular, an output of the timing controller 20 is connected to a PDF terminal of the display panel 10, and the timing controller 20 is configured to detect a severity of a display problem of the display panel 10 and output a PDF signal to the display panel 10 and the second switch 502. For example, when the display panel 10 has a common display problem, a low-level PDF signal is output; when the display panel 10 has a special display problem, a high-level PDF signal is output.

A feedback voltage terminal of the display panel 10 is respectively connected to a second input of the operational amplifier circuit 40 and a control terminal of the second switch 502, and is configured to output a feedback voltage VCOM_FB.

An input of the second switch 502 is connected to a first output of the power management circuit 30 and is configured to receive a common voltage VCOM provided by the power management circuit 30. An output of the second switch 502 is respectively connected to a common voltage terminal of the display panel 10 and a control terminal of the first switch 501, and is configured to output a common voltage VCOM to the display panel 10 and the first switch 501, respectively.

An input of the first switch 501 is connected to a second output of the power management circuit 30, and is configured to receive an operating voltage AVDD. An output of the first switch 501 is connected to a power terminal of the operational amplifier circuit 40, and is configured to provide an operating voltage AVDD to the operational amplifier circuit 40.

A first input of the operational amplifier circuit 40 is connected to a first output of the power management circuit 30, and is configured to receive a common voltage VCOM output by the power management circuit 30. An output of the operational amplifier circuit 40 is connected to a compensating voltage terminal of the display panel 10, and is configured to output a compensating voltage VCOM_IN to the display panel 10.

According to the characteristics of the PMOS and the NMOS and the requirements of the circuit, this embodiment is described by taking the first switch 501 and the second switch 502 in FIG. 12 as the PMOS as an example.

When the first switch 501 and the second switch 502 are the PMOS, a gate electrode (i.e., the control terminal) of the first switch 501 is connected to a drain electrode (i.e., the output) of the second switch 502, a source electrode (i.e., the input) of the first switch 501 is connected to a second output of the power management circuit 30, and a drain electrode (i.e., the output) of the first switch 501 is connected to a power terminal of the operational amplifier circuit 40. A gate electrode (i.e., the control terminal) of the second switch 502 is connected to a feedback voltage terminal of the display panel 10, a source electrode (i.e., the input) of the second switch 502 is connected to a first output of the power management circuit 30, and a drain electrode (i.e., the output) of the second switch 502 is connected to the display panel 10.

The first threshold voltage is greater than 0 and is less than the common voltage VCOM. When the first switch receives the common voltage VCOM, the first switch 501 is turned-off; when the first switch 501 does not receive the common voltage VCOM, the first switch 501 is turned-on. The second threshold voltage is less than the first feedback voltage, and is greater than the second feedback voltage. When the second feedback voltage is received (i.e., the feedback voltage VCOM_FB is less than a target threshold value), the second switch 502 is turned-on. When the first feedback voltage is received (i.e., the feedback voltage VCOM_FB is greater than or equal to the target threshold value), the second switch 502 is turned off.

The working principle of the compensation circuit provided in FIG. 12 is described below with reference to FIG. 12.

When the display panel 10 has a non-target display problem, and when a waveform analysis module analyzes that the feedback voltage VCOM_FB is greater than or equal to the target threshold value, it indicates that the current display panel 10 has a first type of non-target display problem, and compensation on the common voltage VCOM needs to be performed to solve this type of display problem.

In particular, since the second switch 502 is a PMOS and has the characteristics of being turned-on under low level and being cut off under high level, when the feedback voltage VCOM_FB is the first type of feedback voltage, in the third stage, the second switch 502 is turned-off, and thus the second switch 502 stops outputting the common voltage VCOM to the display panel 10. In the fifth sub-stage, the second switch 502 just receives the first-type feedback voltage and starts to be in a turned-off stage, the common voltage VCOM output by the second switch 502 is not completely cut off in this stage. In the sixth sub-stage, the second switch 502 has been able to stably and continuously receive the first-type feedback voltage, and is in a fully turned-off stage, the output common voltage VCOM has been completely cut off.

Since the first switch 501 is also a PMOS, and has the characteristics of being turned-on under low level and being turned-off under high level, and in order to reduce the loss to the first switch 501 caused due to unstable voltage, in the fifth sub-stage, the common voltage VCOM is not completely cut off, thus, the first switch 501 may also receive the common voltage VCOM and remains in a turned-off state, and stops outputting the operating voltage AVDD to the operational amplifier circuit 40, the operational amplifier circuit 40 is in a non-operating state. In the sixth sub-stage, the common voltage VCOM has been completely cut off, the first switch 501 cannot receive the common voltage VCOM, thus, the first switch 501 is turned-on and starts to output the operating voltage AVDD to the operational amplifier circuit 40, and the operational amplifier circuit 40 is in an operating state.

The operational amplifier circuit 40 in the operating state may receive the common voltage VCOM provided by the power management circuit 30 and the feedback voltage VCOM_FB provided by the display panel 10, and then determine a compensation coefficient according to a ratio of an internal feedback resistance to an input resistance, and subsequently output the compensating voltage VCOM_IN to the display panel 10 according to the compensation coefficient to compensate the common voltage in the display panel 10, thereby solving the display problem of the display panel 10.

When the display panel 10 has a non-target display problem, and when the waveform analysis module determines that the feedback voltage VCOM_FB is less than the target threshold through analysis value, it indicates that the current display panel 10 has a second type of non-target display problem, and it is unnecessary to perform the compensation on the common voltage VCOM, in order to achieve the purpose of reduction of power consumption.

In particular, when the feedback voltage VCOM_FB is the second type of feedback voltage, in the fourth stage, the second switch 502 is turned-on, and the second switch 502 outputs the common voltage VCOM to the display panel 10. In the seventh sub-stage, the second switch 502 just receives the second-type feedback voltage and starts to be in the turned-on phase, and the common voltage VCOM output by the second switch 502 is not stable in this stage. In the eighth sub-stage, the second switch 502 has been able to stably and continuously receive the second-type feedback voltage, and is in a fully turned-on phase, and the second switch 502 may output a stable common voltage VCOM in this stage.

In the seventh sub-stage, the unstable common voltage VCOM cannot enable the first switch 501 to be turned off, the first switch 501 continues to be in the turned-on stage, and the first switch 501 outputs the operating voltage AVDD to the operational amplifier circuit 40. In the eighth sub-stage, the stable common voltage VCOM may control the first switch 501 to be turned off, and the first switch 501 stops outputting the operating voltage AVDD to the operational amplifier circuit.

In the seventh sub-stage, since the operational amplifier circuit 40 can receive the operating voltage AVDD output by the first switch 501, the operational amplifier circuit 40 is still in the operating state in the seventh sub-stage. In the eighth sub-stage, the operational amplifier circuit 40 cannot receive the operating voltage AVDD output by the first switch 501 and thus switches to a non-enabled state in the eighth sub-stage, stops receiving the common voltage VCOM output by the power management circuit 30, stops receiving the feedback voltage VCOM_FB output by the display panel 10, and stops outputting the compensating voltage VCOM_IN to the display panel 10.

The third stage is used to indicate a stage in which the feedback voltage VCOM_FB is greater than or equal to the target threshold value. The fourth stage is used to indicate a stage in which the feedback voltage VCOM_FB is less than the target threshold value. The fifth sub-stage represents a startup stage of the delay circuit when the feedback voltage VCOM_FB is greater than or equal to the target threshold value. The sixth sub-stage represents a stabilization stage of the delay circuit when the feedback voltage VCOM_FB is greater than or equal to the target threshold value. The seventh sub-stage represents the startup stage of the delay circuit when the feedback voltage VCOM_FB is less than the target threshold value. The eighth sub-stage represents the stabilization stage of the delay circuit when the feedback voltage VCOM_FB is less than the target threshold value.

In one aspect, the compensation circuit provided by this embodiment of the present application may reduce the occurrence of the loss of the common voltage caused due to simultaneous switching of the DC-type common voltage VCOM and the AC-type compensating voltage VCOM_IN, thereby reducing the probability of occurrence of abnormal display image of the display panel, and further improving the stability of the compensation circuit. In other aspect, due to the fact that the non-target display problem may be subdivided, the compensation on the common voltage VCOM is performed with the occurrence of the first type of non-target display problem, the compensation on the common voltage VCOM is not performed with the occurrence of the second type of non-target display problem. Thus, the accuracy of compensation in case that the PDF signal is at low level may be improved, and the power consumption of the compensation circuit is further reduced.

Seventh Embodiment

Figure 13:
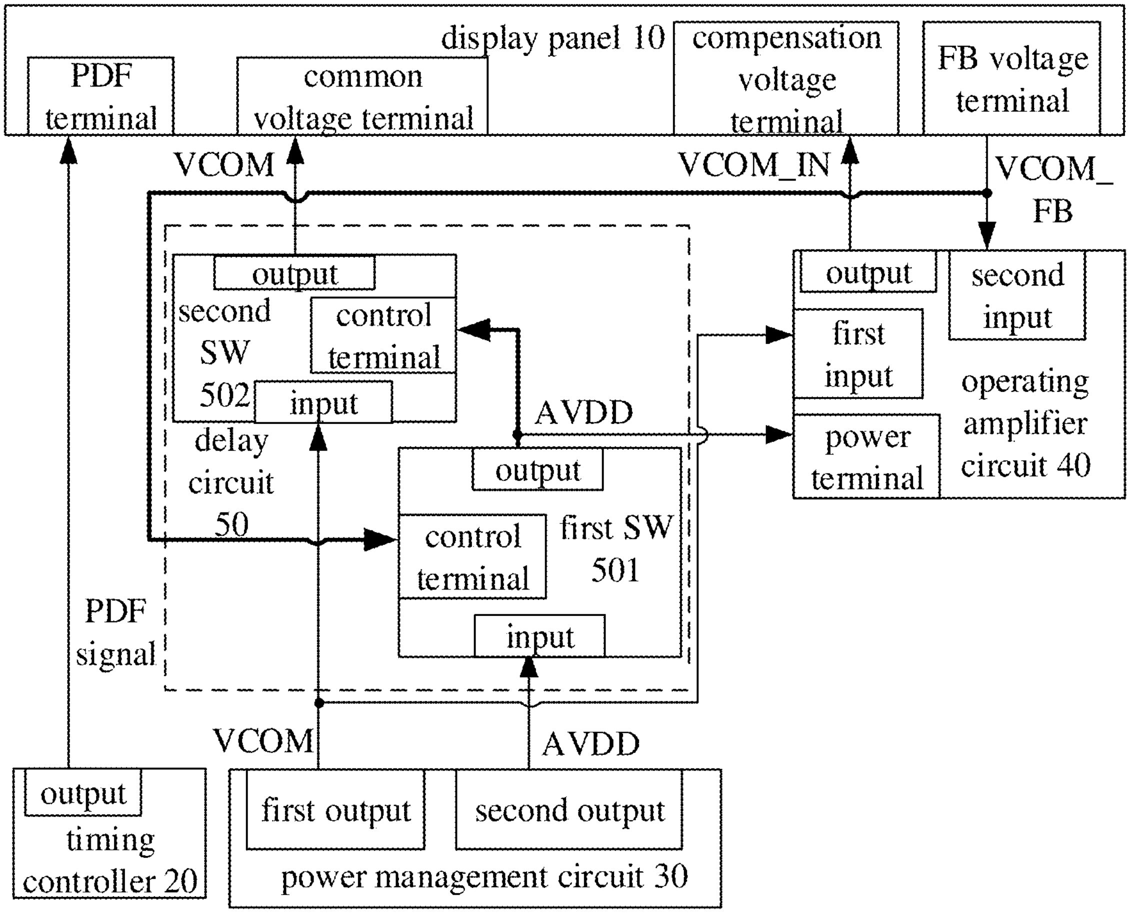
FIG. 13 is a schematic circuit configuration of another compensation circuit having two switches, according to one embodiment of the present application.
Figure 15:
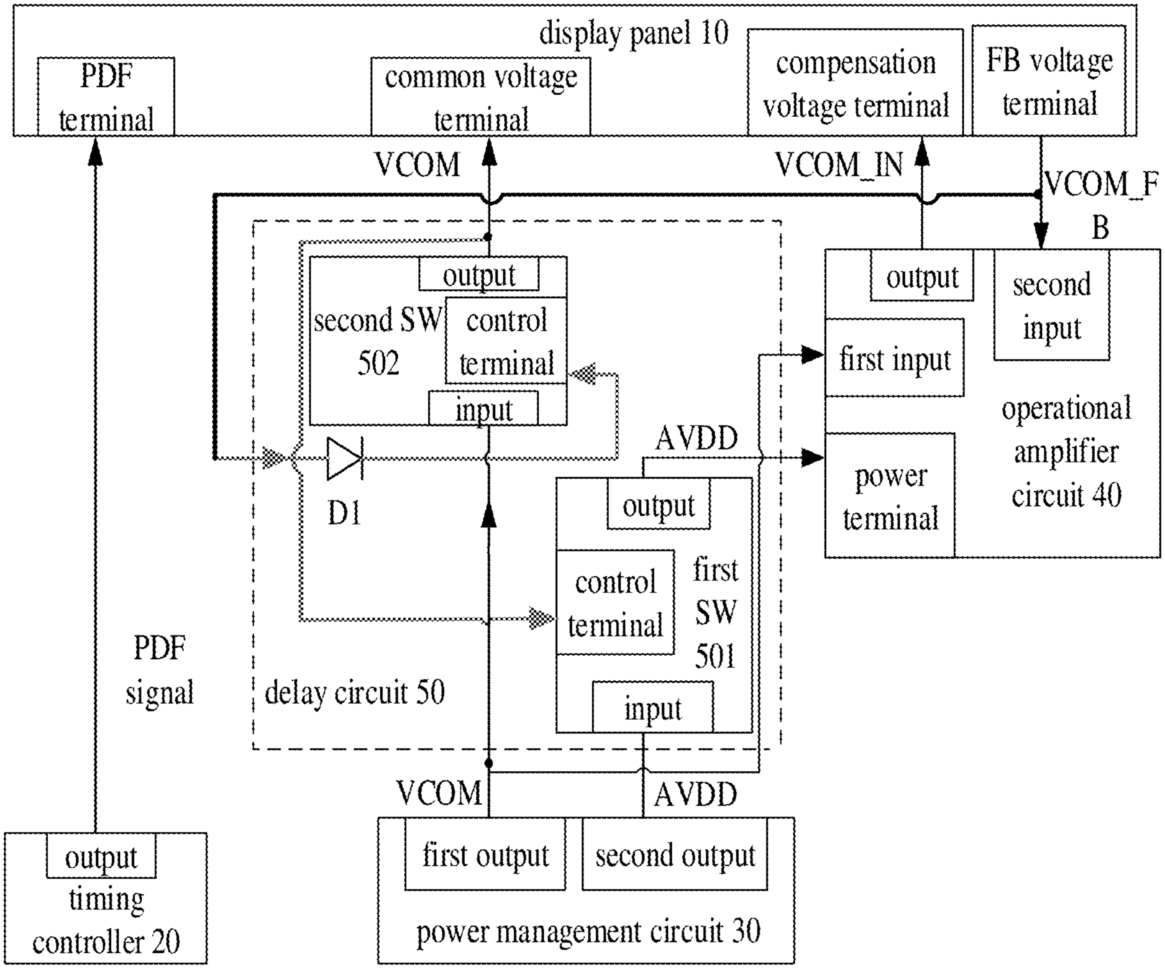
FIG. 15 is a schematic diagram of conduction condition in FIG. 14 when a feedback voltage is a second feedback voltage, according to one embodiment of the present application.

FIG. 13 is a schematic circuit configuration of another compensation circuit having two switches according to one embodiment of the present application. As shown in FIG. 13, the difference between FIG. 13 and FIG. 5 lies in that the control signal connected to the control terminal of the first switch 501 in FIG. 13 and the control signal connected to the control terminal of the first switch 501 in FIG. 15 are different.

In particular, an output of the timing controller 20 is connected to a PDF terminal of the display panel 10, the timing controller 20 is configured to detect a severity of a display problem of the display panel 10 and output the PDF signal to the display panel 10. For example, when the display panel 10 has a common display problem, a low-level PDF signal is output. When the display panel 10 has a special display problem, a high-level PDF signal is output.

A feedback voltage terminal of the display panel 10 is respectively connected to a second input of the operational amplifier circuit 40 and a control terminal of the first switch 501, and is configured to output the feedback voltage VCOM_FB.

An input of the first switch 501 is connected to a second output of the power management circuit 30 and is configured to receive an operating voltage AVDD provided by the power management circuit 30. An output of the first switch 501 is respectively connected to a power terminal of the operational amplifier circuit 40 and a control terminal of the second switch 502, and is configured to provide an operating voltage AVDD to the operational amplifier circuit 40 and the second switch 502, respectively.

An input of the second switch 502 is connected to a first output of the power management circuit 30 and is configured to receive a common voltage VCOM provided by the power management circuit 30. An output of the second switch 502 is connected to a common voltage terminal of the display panel 10, and is configured to output a common voltage VCOM to the display panel 10.

A first input of the operational amplifier circuit 40 is connected to a first output of the power management circuit 30, and is configured to receive a common voltage VCOM provided by the power management circuit 30. An output of the operational amplifier circuit 40 is connected to a compensating voltage terminal of the display panel 10, and is configured to output a compensating voltage VCOM_IN to the display panel 10.

According to the characteristics of the PMOS and the NMOS and the requirements of the circuit, this embodiment is described by taking the first switch 501 in FIG. 13 is a NMOS and taking the second switch 502 in FIG. 13 as a PMOS as an example.

When the first switch 501 is a NMOS and the second switch 502 is a PMOS, a gate electrode (i.e., the control terminal) of the first switch 501 is connected to a feedback voltage terminal of the display panel 10, a drain electrode (i.e., the input) of the first switch 501 is connected to a second output of the power management circuit 30, a source electrode (i.e., the output) of the first switch 501 is respectively connected to a power terminal of the operational amplifier circuit 40 and a gate electrode (i.e., the control terminal) of the second switch 502. A source electrode (i.e., the input) of the second switch 502 is connected to a first output of the power management circuit 30, and a drain electrode (i.e., the output) of the second switch 502 is connected to the display panel 10.

The first threshold voltage is greater than the second threshold voltage and is less than a first feedback voltage. When the first feedback voltage is received, the first switch 501 is turned-on, when the second feedback voltage is received, the first switch 501 is turned-off. The second threshold voltage is greater than 0 and is less than the operating voltage AVDD. When the operating voltage AVDD can be received by the second switch 502, the second switch 502 is turned-off. When the operating voltage AVDD cannot be received by the second switch 502, the second switch 502 is turned-on.

The working principle of the compensation circuit provided in FIG. 13 is described below with reference to FIG. 13.

When the display panel 10 has a non-target display problem, and when the waveform analysis module determines that the feedback voltage VCOM_FB is greater than or equal to the target threshold value through analysis, it indicates that the current display panel 10 has a first type of non-target display problem, and compensation on the common voltage VCOM needs to be performed to solve this type of display problem.

In particular, since the first switch 501 is a NMOS and has the characteristics of being turned-on under high level and being turned-off under low level, when the feedback voltage VCOM_FB is the first type of feedback voltage, in the third stage, the first switch 501 is turned-on, and the first switch 501 outputs the operating voltage AVDD to the operational amplifier circuit 40. In the fifth sub-stage, the first switch 501 just receives the first-type feedback voltage and starts to be in a turned-on stage, and the operating voltage AVDD output by the first switch 501 is still unstable in this stage. In the sixth sub-stage, the first switch 501 has been able to stably and continuously receive the first-type feedback voltage, and is in a fully turned-on phase, and the first switch 501 may stably output the operating voltage AVDD in this stage.

Since the second switch 502 is a PMOS, the second switch 502 has the characteristics of being turned-on under low level and being turned-off under high level, and in order to reduce the loss to the second switch 502 caused due to unstable voltage, in the fifth sub-stage, the unstable operating voltage AVDD cannot enable the second switch 502 to be turned off, the second switch 502 continues to be in the turned-on phase, and thus outputs the common voltage VCOM to the display panel 10. In the sixth sub-stage, the stable operating voltage AVDD may control the second switch 502 to be turned-off, and thus the second switch 502 stops outputting the common voltage VCOM to the display panel 10.

Since the operational amplifier circuit 40 may receive the common voltage VCOM output by the first switch 501 in the third stage, thus, the operational amplifier circuit 40 is in an operating state in the third stage. The operational amplifier circuit 40 in the operating state may receive the common voltage VCOM provided by the power management circuit 30 and the feedback voltage VCOM_FB provided by the display panel 10, and then determine a compensation coefficient according to a ratio of an internal feedback resistance to an input resistance, and output the compensating voltage VCOM_IN to the display panel 10 according to the compensation coefficient subsequently to compensate the common voltage in the display panel 10, thereby solving the display problem of the display panel 10.

When the display panel 10 has a non-target display problem, and when the waveform analysis module determines that the feedback voltage VCOM_FB is less than the target threshold value through analysis, it indicates that the current display panel 10 has a second type of non-target display problem, and it is unnecessary to perform the compensation on the common voltage VCOM, in order to achieve the purpose of reduction of power consumption.

In particular, when the feedback voltage VCOM_FB is the second-type feedback voltage, in the fourth stage, the first switch 501 is turned-off, and thus the first switch 501 stops outputting the operating voltage AVDD to the operational amplifier circuit 40. In the seventh sub-stage, the first switch 501 just receives the second-type feedback voltage and starts to be in a turned-off stage, and the operating voltage AVDD output by the first switch 501 is not completely cut off in this stage. In the eighth sub-stage, the first switch 501 has been able to stably and continuously receive the second-type feedback voltage and is in a fully turned-off stage, the output operating voltage AVDD has been completely cut off.

In the seventh sub-stage, the operating voltage AVDD is not completely cut off, and the second switch 502 may still receive the operating voltage AVDD. Thus, the second switch 502 remains in the turned-on state and continues to output the common voltage VCOM to the display panel 10. In the eighth sub-stage, the operating voltage AVDD has been completely cut off, the second switch 502 cannot receive the operating voltage AVDD, and thus the second switch 502 is turned-off, the second switch 502 stops outputting the common voltage VCOM to the display panel 10.

In one aspect, the compensation circuit provided by this embodiment of the present application may reduce the occurrence of the loss of the common voltage caused due to simultaneous switching of the DC-type common voltage VCOM and the AC-type compensating voltage VCOM_IN, thereby reducing the probability of occurrence of abnormal display image of the display panel, and further improving the stability of the compensation circuit. In other aspect, due to the fact that the non-target display problem may be subdivided, the compensation on the common voltage VCOM is performed with the occurrence of the first type of non-target display problem, the compensation on the common voltage VCOM is not performed with the occurrence of the second type of non-target display problem. Thus, the accuracy of compensation in case that the PDF signal is at low level may be improved, and the power consumption of the compensation circuit is further reduced.

Eighth Embodiment

Figure 16:
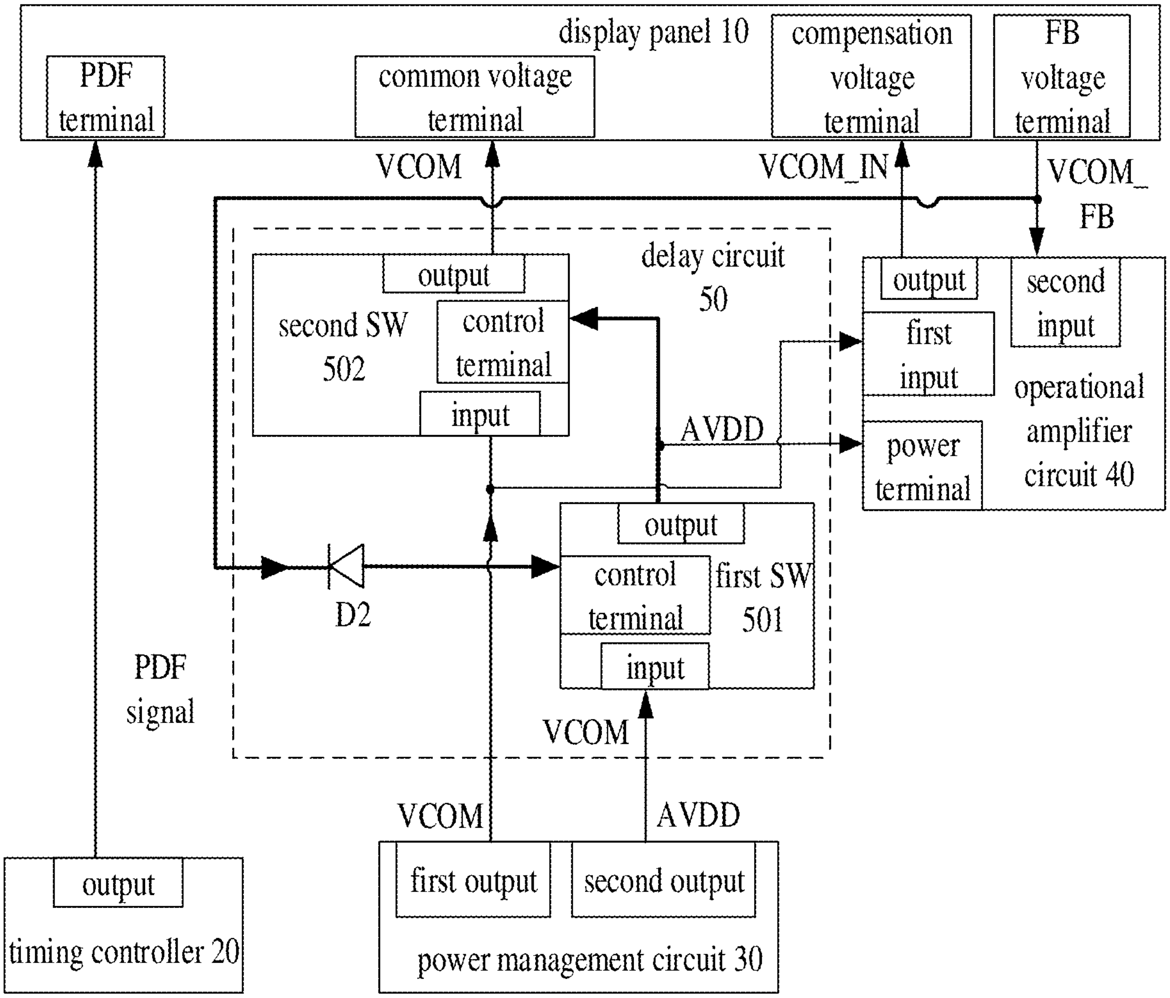
FIG. 16 is a schematic circuit configuration of conduction condition of the compensation circuit in FIG. 14 when a feedback voltage is a first feedback voltage, according to one embodiment of the present application.

FIG. 14 is a schematic circuit configuration of another compensation circuit having two switches and two diodes according to one embodiment of the present application. As shown in FIG. 14, the difference between FIG. 14 and FIG. 6 lies in that the control signals in FIG. 14 and FIG. 16 are different.

In particular, an output of the timing controller 20 is connected to a PDF terminal of the display panel 10, the timing controller 20 is configured to detect a severity of a display problem of the display panel 10 and output a PDF signal to the display panel 10. For example, when the display panel 10 has a common display problem, a low-level PDF signal is output; when the display panel 10 has a special display problem, a high-level PDF signal is output.

A feedback voltage terminal of the display panel 10 is connected to a control terminal of the second switch 502 through a first diode D1, and is further connected to a control terminal of the first switch 501 through a second diode D2, and is connected to a second input of the operational amplifier circuit 40.

The control terminal of the first switch 501 is further connected to an output of the second switch 502, and is configured to receive a common voltage VCOM output by the second switch 502. An input of the first switch 501 is connected to a second output of the power management circuit 30, and is configured to receive an operating voltage AVDD output by the power management circuit 30. An output of the first switch 501 is connected to the control terminal of the second switch 502 and the power terminal of the operational amplifier circuit 40, respectively, and is configured to output the operating voltage AVDD.

The output of the second switch 502 is further connected to a common voltage terminal of the display panel 10, and is configured to output the common voltage VCOM to the display panel 10. An input of the second switch 502 is connected to a first output of the power management circuit 30, and is configured to receive the common voltage VCOM output by the power management circuit 30.

A first input of the operational amplifier circuit 40 is connected to the first output of the power management circuit 30, and is configured to receive the common voltage VCOM provided by the power management circuit 30. An output of the operational amplifier circuit 40 is connected to a compensating voltage terminal of the display panel 10, and is configured to output a compensating voltage VCOM_IN to the display panel 10.

According to the characteristics of the PMOS and the NMOS and the requirements of the circuit, this embodiment is described by taking the first switch 501 in FIG. 14 as a NMOS and taking the second switch 502 in the FIG. 14 as a PMOS as an example.

When the first switch 501 is a NMOS and the second switch 502 is a PMOS, a gate electrode (i.e., the control terminal) of the first switch 501 is connected to an anode of the second diode D2 and a drain electrode (i.e., the output) of the second switch 502, a drain electrode (i.e., the input) of the first switch 501 is connected to the second output of the power management circuit 30, and a source electrode (i.e., the output) of the first switch 501 is respectively connected to the power terminal of the operational amplifier circuit 40 and a gate electrode (i.e., the control terminal) of the second switch 502. A gate electrode (i.e., the control terminal) of the second switch 502 is further connected to a cathode of the first diode D1, a source electrode (i.e., the input) of the second switch 502 is connected to the first output of the power management circuit 30, and a drain electrode (i.e., the output) of the second switch 502 is further connected to the display panel 10.

The first threshold voltage is greater than the common voltage VCOM and is less than a first feedback voltage. When the first feedback voltage is received, the first switch 501 is turned-on. When the first switch 501 can receive the common voltage VCOM, the first switch 501 is turned-off. The second threshold voltage is greater than the second feedback voltage and is less than the operating voltage AVDD. When the second switch 502 can receive the operating voltage AVDD, the second switch 502 is turned-off. When the second feedback voltage is received, the second switch 502 is turned-on.

It should be noted that the voltage value of the common voltage VCOM in this embodiment of the present application is less than the second feedback voltage, the second feedback voltage is less than the first feedback voltage, and the first feedback voltage is less than the operating voltage AVDD.

The working principle of the compensation circuit provided in FIG. 14 is described below with reference to FIG. 15 and FIG. 16.

FIG. 15 is a schematic diagram of a conduction condition of the compensation circuit of FIG. 14 when the feedback voltage is the second feedback voltage according to one embodiment of the present application. As shown in FIG. 15, when the display panel 10 has a non-target display problem, and when the waveform analysis module determines that the feedback voltage VCOM_FB is less than the target threshold through analysis, it indicates that the current display panel 10 has a second type of non-target display problem, and it is unnecessary to perform compensation on the common voltage VCOM, in order to achieve the purpose of reduction of power consumption.

In particular, since the second switch 502 is a PMOS and has the characteristics of being turned-on under low level and being turned-off under high level, when the feedback voltage VCOM_FB is the second feedback voltage, in the fourth stage, the first diode D1 is turned-on, the second switch 502 is turned-on, and thus the second switch 502 outputs the common voltage VCOM to the display panel 10. In the seventh sub-stage, the second switch 502 just receives the second feedback voltage and starts to be in a turned-on phase, and the common voltage VCOM output by the second switch 502 is unstable in this stage. In the eighth sub-stage, the second switch 502 has been able to stably and continuously receive the second feedback voltage, is in a fully turned-on phase. The second switch 502 may output a stable common voltage VCOM in this stage.

Since the first switch 501 is a NMOS and has the characteristics of being turned-on under high level and being turned-off under low level, and in order to reduce the loss to the first switch 501 caused due to unstable voltage, the first switch 501 cannot be turned off by the unstable common voltage VCOM in the seventh sub-stage, the first switch 501 continues to be in the turned-on phase, and the first switch 501 outputs the operating voltage AVDD to the operational amplifier circuit 40. In the eighth sub-stage, the stable common voltage VCOM can control the first switch 501 to be turned-off, and thus the first switch 501 stops outputting the operating voltage AVDD to the operational amplifier circuit.

Since the operational amplifier circuit 40 can receive the operating voltage AVDD output by the first switch 501 in the seventh sub-stage, the operational amplifier circuit 40 is still in the operating state in the seventh sub-stage. Since the operational amplifier circuit 40 cannot receive the operating voltage AVDD output by the first switch 501 in the seventh sub-stage, the operational amplifier circuit 40 switches to a non-enabled state in the eighth sub-stage, stops receiving the common voltage VCOM output by the power management circuit 30, stops receiving the feedback voltage VCOM_FB output by the display panel 10, and stops outputting the compensating voltage VCOM_IN to the display panel 10.

FIG. 16 is a schematic diagram of a conduction condition of the compensation circuit in FIG. 14 when the feedback voltage is the first feedback voltage according to one embodiment of the present application. As shown in FIG. 16, when the display panel 10 has a non-target display problem, and when the waveform analysis module determines that the feedback voltage VCOM_FB is greater than or equal to the target threshold value through analysis, it indicates that the current display panel 10 has the first type of non-target display problem, and it is necessary to perform the compensation on the common voltage VCOM to solve this type of display problem.

In particular, since the first switch 501 is a NMOS and has the characteristics of being turned-on under high level and being turned-off under low level, when the feedback voltage VCOM_FB is the first feedback voltage, in the third stage, the second diode D2 is turned-on, the first switch 501 is turned-on, and the first switch 501 outputs the operating voltage AVDD to the operational amplifier circuit 40. In the fifth sub-stage, the first switch 501 just receives the first feedback voltage and starts to be in the turned-on stage, and the operating voltage AVDD output by the first switch 501 is still unstable in this stage. In the sixth sub-stage, the first switch 501 has been able to stably and continuously receive the first feedback voltage, and is in a fully turned-on phase. The first switch 501 may stably output the operating voltage AVDD in this stage.

In the fifth sub-stage, the second switch 502 cannot be turned off by the unstable operating voltage AVDD, the second switch 502 continues to be in the turned-on stage, and the second switch 502 outputs the common voltage VCOM to the display panel 10. In the sixth sub-stage, the stable operating voltage AVDD may control the second switch 502 to be turned-off, and thus the second switch 502 stops outputting the common voltage VCOM to the display panel 10.

Since the operational amplifier circuit 40 may receive the operating voltage AVDD output by the first switch 501 in the third stage, the operational amplifier circuit 40 is in the operating state in the third stage. The operational amplifier circuit 40 in the operating state may receive the common voltage VCOM provided by the power management circuit 30 and the feedback voltage VCOM_FB provided by the display panel 10, and then determine a compensation coefficient according to a ratio of an internal feedback resistance to an input resistance, and output the compensating voltage VCOM_IN to the display panel 10 according to the compensation coefficient subsequently to compensate the common voltage in the display panel 10, thereby solving the display problem of the display panel 10.

In one aspect, the compensation circuit provided by this embodiment of the present application may reduce the occurrence of the loss of the common voltage caused due to simultaneous switching of the DC-type common voltage VCOM and the AC-type compensating voltage VCOM_IN, thereby reducing the probability of occurrence of abnormal display image of the display panel, and further improving the stability of the compensation circuit. In other aspect, due to the fact that the non-target display problem may be subdivided, the compensation on the common voltage VCOM is performed with the occurrence of the first type of non-target display problem, the compensation on the common voltage VCOM is not performed with the occurrence of the second type of non-target display problem. Thus, the accuracy of compensation in case that the PDF signal is at low level may be improved, and the power consumption of the compensation circuit is further reduced.

Ninth Embodiment

Figure 17:
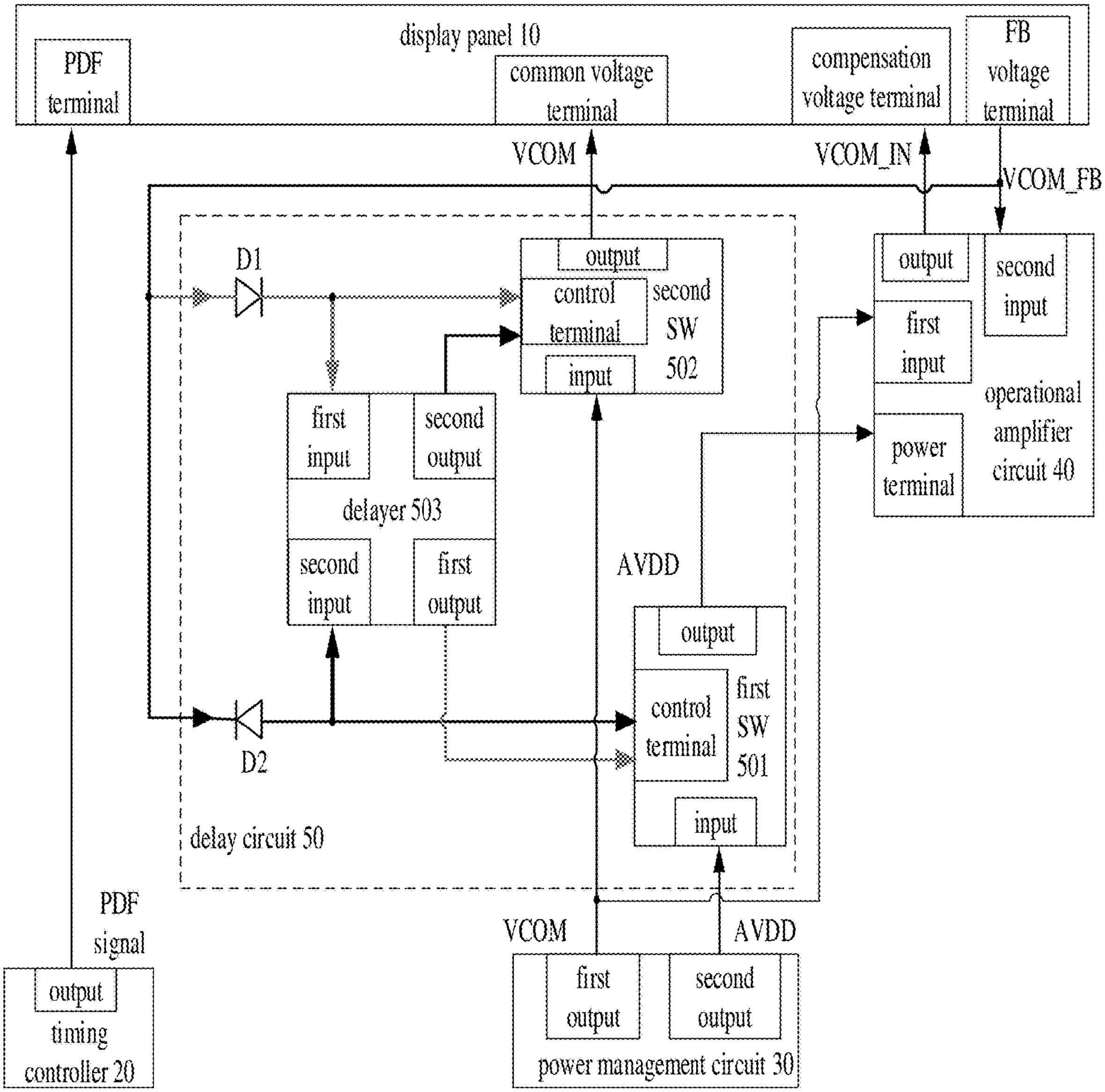
FIG. 17 is a schematic circuit configuration of another compensation circuit having two switches, two diodes, and a delayer when the compensation circuit is conductive, according to one embodiment of the present application.
Figure 19:
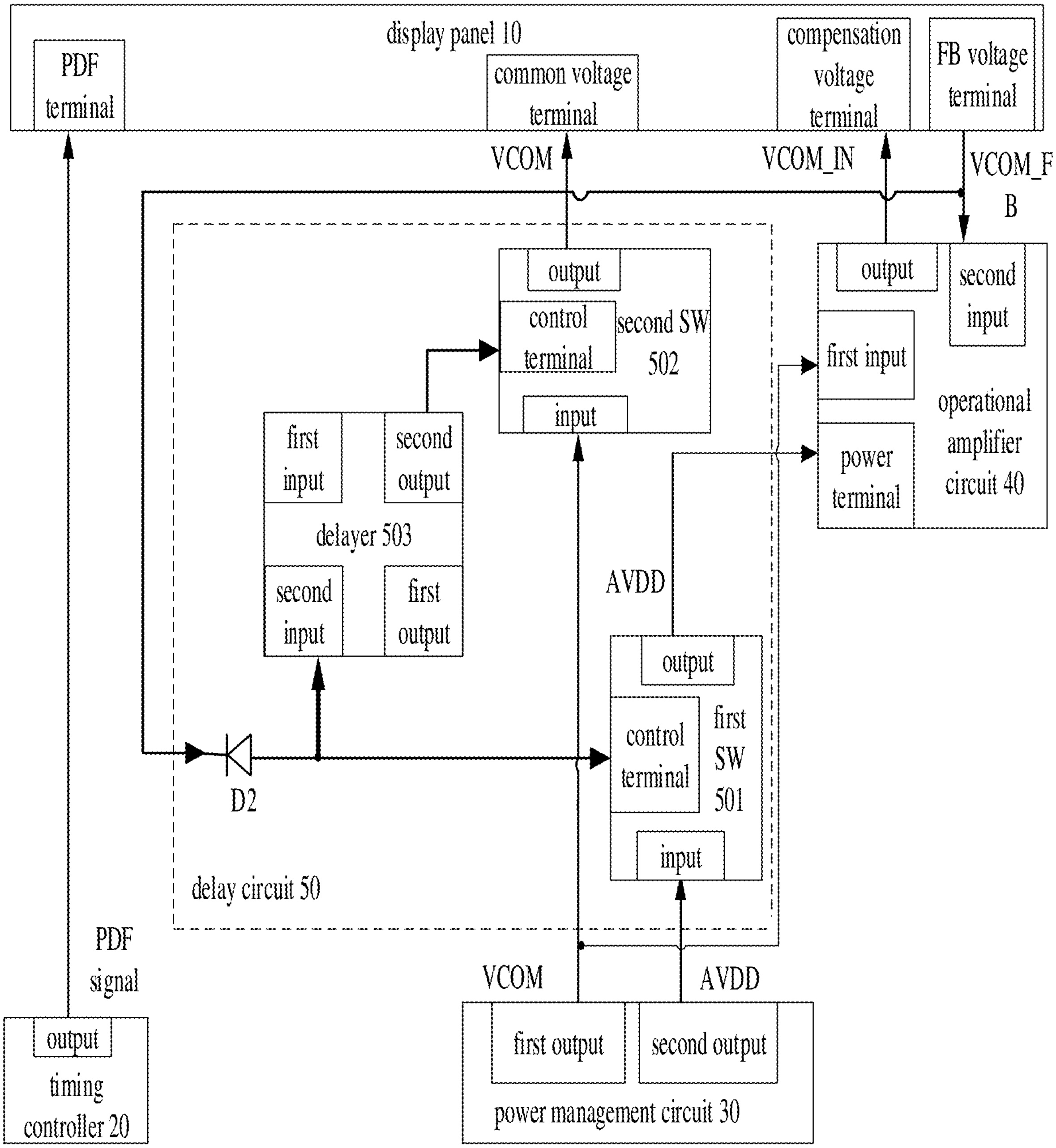
FIG. 19 is a schematic circuit configuration of conduction condition of the compensation circuit in FIG. 17 when a feedback voltage is a first feedback voltage, according to one embodiment of the present application.

FIG. 17 is a schematic circuit configuration of another compensation circuit having two switches, two diodes and one delayer according to one embodiment of the present application. As shown in FIG. 17, the difference between FIG. 17 and FIG. 9 lies in that the control signals in FIG. 17 and FIG. 19 are different.

In particular, an output of the timing controller 20 is connected to a PDF terminal of the display panel 10, the timing controller 20 is configured to detect a severity of a display problem of the display panel 10 and output a PDF signal to the display panel 10. For example, when the display panel 10 has a common display problem, a low-level PDF signal is output; when the display panel 10 has a special display problem, a high-level PDF signal is output.

A feedback voltage terminal of the display panel 10 is respectively connected to a first input of the delayer 503 and a control terminal of the second switch 502 through the first diode D1, and is further connected to a second input of the delayer 503 and a control terminal of the first switch 501 respectively through the second diode D2. The feedback voltage terminal of the display panel 10 is further connected to the second input of the operational amplifier circuit 40, in order to output the feedback voltage VCOM_FB.

A first output of the delayer 503 is connected to a control terminal of the first switch 501, and is configured to output a high-level PDF signal to the first switch 501. A second output of the delayer 503 is connected to the control terminal of the second switch 502, and is configured to output a low-level PDF signal to the second switch 502.

An input of the first switch 501 is connected to a second output of the power management circuit 30, and is configured to receive an operating voltage AVDD output by the power management circuit 30. An output of the first switch 501 is connected to a power terminal of the operational amplifier circuit 40, and is configured to output an operating voltage AVDD to the operational amplifier circuit 40.

An input of the second switch 502 is connected to a first output of the power management circuit 30 and is configured to receive a common voltage VCOM output by the power management circuit 30. An output of the second switch 502 is connected to a common voltage terminal of the display panel 10, and is configured to output the common voltage VCOM to the display panel 10.

A first input of the operational amplifier circuit 40 is connected to a first output of the power management circuit 30, and is configured to receive the common voltage VCOM provided by the power management circuit 30. An output of the operational amplifier circuit 40 is connected to a compensating voltage terminal of the display panel 10, and is configured to output a compensating voltage VCOM_IN to the display panel 10.

According to the characteristics of the PMOS and the NMOS and the requirements of the circuit, this embodiment is described by taking the first switch 501 in FIG. 9 is a NMOS and taking the second switch 502 in FIG. 9 as a PMOS as an example.

When the first switch 501 is a NMOS and the second switch 502 is a PMOS, a gate electrode (i.e., the control terminal) of the first switch 501 is respectively connected to a first output of the delayer 503 and an anode of the second diode D2, a drain electrode (i.e., the input) of the first switch 501 is connected to a second output of the power management circuit 30, and a source electrode (i.e., the output) of the first switch 501 is connected to a power terminal of the operational amplifier circuit 40. A gate electrode (i.e., the control terminal) of the second switch 502 is respectively connected to a second output of the delayer 503 and a cathode of the first diode D1, a source electrode (i.e., the input) of the second switch 502 is connected to a first output of the power management circuit 30, and a drain electrode (i.e., the output) of the second switch 502 is connected to the display panel 10.

The first threshold voltage is greater than the second threshold voltage, and is less than a first feedback voltage. When the first switch 501 receives the first feedback voltage, the first switch 501 is turned-on; when the first switch 501 receives the second feedback voltage, the first switch 501 is turned-off. The second threshold voltage is greater than the second feedback voltage and is less than the first feedback voltage. When the second switch receives the first feedback voltage, the second switch 502 is turned-off; when the second switch 502 receives the second feedback voltage, the second switch 502 is turned-on.

The working principle of the compensation circuit provided in FIG. 17 is described below with reference to FIG. 18 and FIG. 19.

Figure 18:
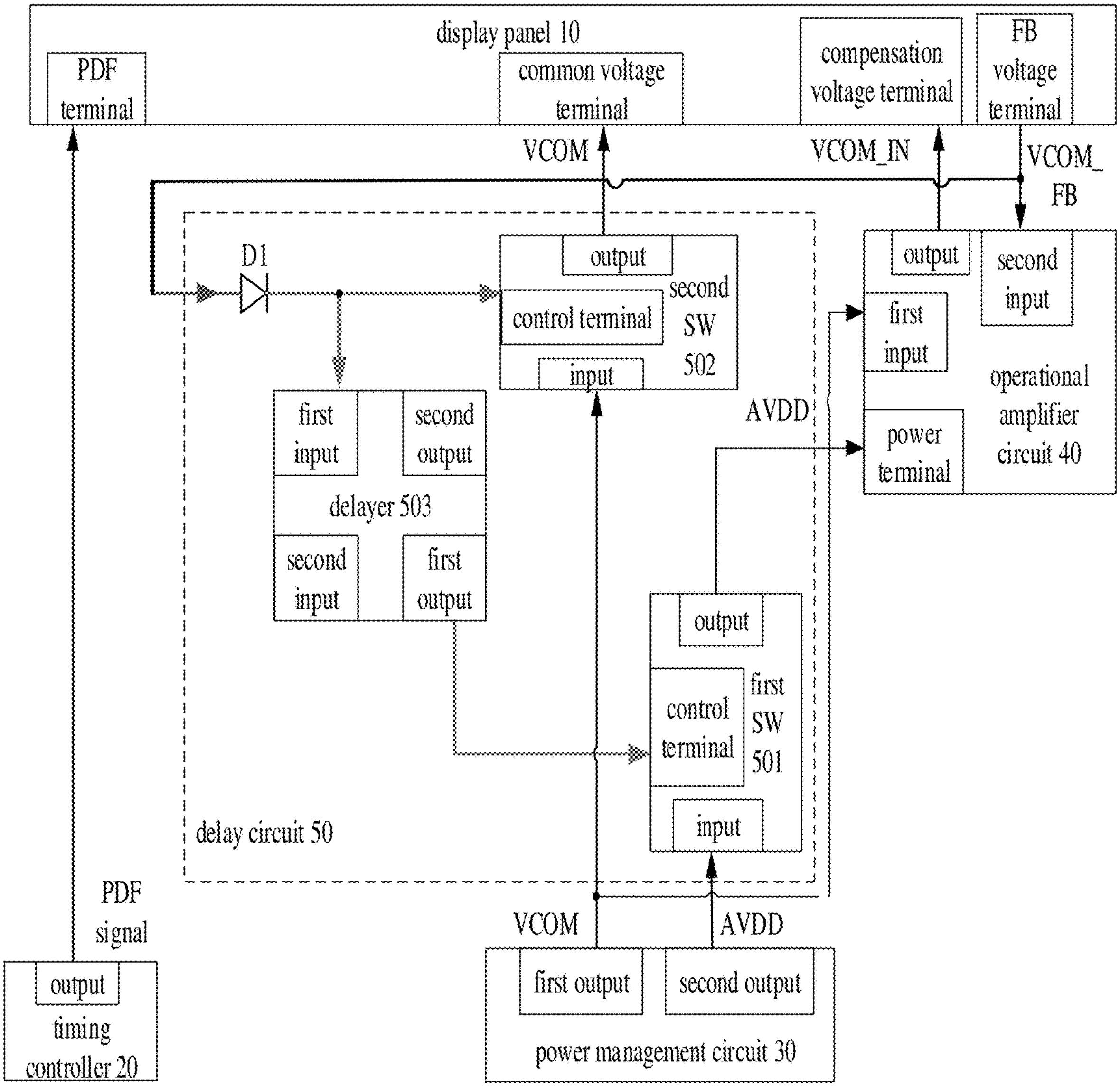
FIG. 18 is a schematic circuit configuration of conduction condition of the compensation circuit in FIG. 17 when a feedback voltage is a second feedback voltage according to one embodiment of the present application.

FIG. 18 is a schematic diagram of a conduction condition of the compensation circuit in FIG. 17 when the feedback voltage is the second feedback voltage according to one embodiment of the present application. As shown in FIG. 18, when the display panel 10 has a non-target display problem, and when the waveform analysis module determines that the feedback voltage VCOM_FB is less than a target threshold value through analysis, it indicates that the current display panel 10 has a second type of non-target display problem, and the compensation on the common voltage VCOM is unnecessary, in order to achieve the purpose of reduction of power consumption.

In particular, since the second switch 502 is a PMOS and has the characteristics of being turned-on under low level and being turned-off under high level, when the feedback voltage VCOM_FB is the second feedback voltage, in the fourth stage, the first diode D1 is turned-on, the second switch 502 is turned-on, and thus the second switch 502 outputs the common voltage VCOM to the display panel 10. In the seventh sub-stage, the delayer 503 performs a delay function, which means that the time at which the second feedback voltage reaches the first switch 501 may be delayed in this stage (equaling the delay 503 stops outputting the second feedback voltage to the first switch 501). The first switch 501 continues to remain in the turned-on state without receiving the second feedback voltage, and the first switch 501 continues to output the operating voltage AVDD to the operational amplifier circuit 40. In the eighth sub-stage, the delayer 503 stops performing the delaying function, and starts to output a second feedback voltage to the first switch 501 to control the first switch 501 to be turned-off, and thus the first switch 501 stops outputting the operating voltage AVDD to the operational amplifier circuit 40.

The operational amplifier circuit 40 may receive the operating voltage AVDD output by the first switch 501 in the seventh sub-stage, the operational amplifier circuit 40 continues to maintain the operating state in this stage. The operational amplifier circuit 40 cannot receive the operating voltage AVDD output by the first switch 501 in the eighth sub-stage, and the operational amplifier circuit 40 is switched to a non-enabled state in this stage. The operational amplifier circuit 40 in the non-enabled state stops receiving the common voltage VCOM output by the power management circuit 30, stops receiving the feedback voltage VCOM_FB output by the display panel 10, and stops outputting the compensating voltage VCOM_IN to the display panel 10.

FIG. 19 is a schematic diagram of a conduction condition of the compensation circuit in FIG. 17 when the feedback voltage is the first feedback voltage according to one embodiment of the present application. As shown in FIG. 19, when the display panel 10 has a non-target display problem, and when the waveform analysis module determines that the feedback voltage VCOM_FB is greater than or equal to the target threshold value through analysis, it indicates that the current display panel 10 has the first type of non-target display problem, and the compensation on the common voltage VCOM needs to be performed to solve this type of display problem.

In particular, since the first switch 501 is a NMOS and has the characteristics of being turned-on under high level and being turned-off under low level, when the feedback voltage VCOM_FB is the first feedback voltage, in the third stage, the second diode D2 is turned-on, the first switch 501 is turned-on, and thus the first switch 501 outputs the operating voltage AVDD to the operational amplifier circuit 40. In the fifth sub-stage, the delayer 503 performs a delay function, which means that the time at which the first feedback voltage reaches the second switch 502 may be delayed in this stage (equaling the delay 503 stops outputting the first feedback voltage to the second switch 502). The second switch 502 continues to remain in the turned-on state without receiving the first feedback voltage, and the second switch 502 continues to output the common voltage VCOM to the display panel 10. In the sixth sub-stage, the delayer 503 stops performing the delay function, and starts to output the first feedback voltage to the second switch 502 to control the second switch 502 to be turned-off. The second switch 502 stops outputting the common voltage VCOM to the display panel 10.

Since the operational amplifier circuit 40 can receive the operating voltage AVDD output by the first switch 501, the operational amplifier circuit 40 is switched to the operating state in this stage. The operational amplifier circuit 40 in the operating state may receive the common voltage VCOM provided by the power management circuit 30 and the feedback voltage VCOM_FB provided by the display panel 10, and then determine a compensation coefficient according to a ratio of an internal feedback resistance to an input resistance, and output the compensating voltage VCOM_IN to the display panel 10 according to the compensation coefficient subsequently to compensate the common voltage in the display panel 10, thereby solving the display problem of the display panel 10.

In one aspect, the compensation circuit provided by this embodiment of the present application may reduce the occurrence of the loss of the common voltage caused due to simultaneous switching of the DC-type common voltage VCOM and the AC-type compensating voltage VCOM_IN, thereby reducing the probability of occurrence of abnormal display image of the display panel, and further improving the stability of the compensation circuit. In other aspect, due to the fact that the non-target display problem may be subdivided, the compensation on the common voltage VCOM is performed with the occurrence of the first type of non-target display problem, the compensation on the common voltage VCOM is not performed with the occurrence of the second type of non-target display problem. Thus, the accuracy of compensation in case that the PDF signal is at low level may be improved, and the power consumption of the compensation circuit is further reduced.

A display device is further provided in the embodiments of the present application. The display device includes the display panel and one aforesaid compensation circuit. The display panel is configured to display an image and output a feedback voltage to the compensation circuit, and receive a PDF signal, a compensating voltage, and a common voltage output by the compensation circuit.

The display panel may be a liquid crystal display (Liquid Crystal Display, LCD), or may be an organic light-emitting diode (Organic Light-Emitting Diode, OLED), a twisted nematic (Twisted Nematic, TN) panel, a vertical alignment (VA) panel, or the like. The type of the display panel is not particularly limited in the embodiments of the present application.

In the description of the present application, it should be understand that, terms such as “the first” and “the second” are only for the purpose of illustration, rather than being interpreted as indicating or implying any relative importance, or implicitly indicating the number of indicated technical features. Thus, technical feature(s) restricted by “the first” or “the second” can explicitly or implicitly comprise one or more such technical feature(s).

It should be understood that, when a term “comprise/include” is used in the description and annexed claims, the term “comprise/include” indicates existence of the described characteristics, integer, steps, operations, elements and/or components, but not exclude existence or adding of one or more other characteristics, integer, steps, operations, elements, components and/or combination thereof.

Additionally, in the present application, unless there are additional explicit stipulation and limitation, terms such as “connect”, “connect with each other” and the like should be generalizedly interpreted. For example, “connect” may be interpreted as being mechanically connected or electrically connected; “connect” may also be interpreted as being directly connected or indirectly connected through intermediary; “connect” may also be interpreted as internal communication between two components or an interaction relationship between the two components, unless there is additional explicit limitation. The specific meanings of the aforesaid terms in the present application may be interpreted by the person of ordinary skill in the art according to specific conditions.

The descriptions of “referring to one embodiment” and “referring to some embodiments”, and the like as described in the specification of the present application means that a specific feature, structure, or characters which are described with reference to this embodiment are included in one embodiment or some embodiments of the present application. Thus, the phrases of “in one embodiment”, “in some embodiments”, “in some other embodiments”, “in other embodiments”, and the like in this specification are not necessarily referring to the same embodiment, but instead indicate “one or more embodiments instead of all embodiments”, unless otherwise these phrases are specially emphasized in other manner. Lastly, it should be noted that, the various embodiments mentioned above are only intended to explain the technical solutions of the present application, rather than limiting the technical solutions of the present application. Although the present application has been described in detail with reference to these embodiments, a person of ordinary skilled in the art should understand that, the technical solutions disclosed in the various embodiments may also be amended, or alternatively, some or all technical features in the technical solutions may also be equivalently replaced. The amendments or the replacements don’t cause the essence of the corresponding technical solutions to be deviated from the spirit and the scope of the technical solutions in the various embodiments of the present application.

What is claimed is:

1. A compensation circuit, comprising a timing controller, a power management circuit, an operational amplifier circuit, and a delay circuit, wherein: the timing controller is respectively connected to a display panel and the delay circuit, and is configured to output a partial decode-and-forward (PDF) signal to the display panel and the delay circuit;

the power management circuit is respectively connected to the delay circuit and the operational amplifier circuit, and is configured to output a common voltage and an operating voltage to the delay circuit, and output the common voltage to the operational amplifier circuit;

the delay circuit is further connected to the operational amplifier circuit and the display panel respectively, and is configured to, when the display panel is controlled by the PDF signal to perform a polarity inversion, output the common voltage to the display panel in a first stage, and output the operating voltage to the operational amplifier circuit in a first sub-stage of the first stage, and stop outputting the operating voltage to the operational amplifier circuit in a second sub-stage of the first stage;

the delay circuit is further configured to, when the PDF signal controls the display panel not to perform the polarity inversion, output the operating voltage to the operational amplifier circuit in a second stage, and output the common voltage to the display panel in a third sub-stage of the second stage, and stop outputting the common voltage to the display panel in a fourth sub-stage of the second stage; and the operational amplifier circuit is further connected to the display panel, and is configured to receive the common voltage output by the power management circuit in the first stage and the second stage; the operational amplifier circuit is further configured to receive the operating voltage output by the delay circuit and a feedback voltage output by the display panel in the first sub-stage, the third sub-stage and the fourth sub-stage, and output a compensating voltage to the display panel.

2. The compensation circuit according to claim 1, wherein:

the timing controller is configured to detect display problems of the display panel and output a high level PDF signal to the display panel and the delay circuit so as to control the display panel to perform the polarity inversion, when the display panel has a target display problem; and the timing controller is further configured to detect the display problems of the display panel and output a low-level PDF signal to the display panel and the delay circuit when the display panel has a non-target display problem, to enable the display panel to do not perform the polarity inversion, wherein the display problems comprise greenish or crosstalk of different severity degrees, and the target display problem is used to indicate relatively higher greenish or crosstalk in the display problems.

3. The compensation circuit according to claim 2, wherein: the delay circuit comprises a first switch and a second switch;

a control terminal of the second switch is connected to an output of the timing controller, an input of the second switch is connected to a first output of the power management circuit, and an output of the second switch is respectively connected to a common voltage terminal of the display panel and a control terminal of the first switch;

an input of the first switch is connected to a second output of the power management circuit, and an output of the first switch is connected to a power terminal of the operational amplifier circuit; and when the PDF signal is at a high level, in the first stage, the second switch is turned-on and an output of the second switch outputs the common voltage to the display panel; in the first sub-stage, the first switch is turned-on, and the first switch outputs the operating voltage to the operational amplifier circuit; in the second sub-stage, the first switch is turned-off, and the first switch stops outputting the operating voltage to the operational amplifier circuit.

4. The compensation circuit according to claim 2, wherein; the delay circuit comprises a first switch and a second switch;

a control terminal of the first switch is connected to an output of the timing controller, an input of the first switch is connected to a second output of the power management circuit, and an output of the first switch is connected to a power terminal of the operational amplifier circuit and the control terminal of the second switch, respectively;

an input of the second switch is connected to a first output of the power management circuit, and an output of the second switch is connected to a common voltage terminal of the display panel; and when the PDF signal is at a low level, in the second stage, the first switch is turned-on and the first switch outputs the operating voltage to the operational amplifier circuit;

in the third sub-stage, the second switch is turned-on, the second switch outputs the common voltage to the display panel; in the fourth sub-stage, the second switch is turned-off, and thus the second switch stops outputting the common voltage to the display panel.

5. The compensation circuit according to claim 2, wherein: the delay circuit comprises a first switch, a second switch, a first diode and a second diode;

an output of the timing controller is connected to a control terminal of the second switch through the first diode, and is connected to a control terminal of the first switch through the second diode;

a control terminal of the first switch is further connected to an output of the second switch, an input of the first switch is connected to a second output of the power management circuit, and an output of the first switch is respectively connected to a control terminal of the second switch and a power terminal of the operational amplifier circuit; and the output of the second switch is further connected to a common voltage terminal of the display panel, and an input of the second switch is connected to a first output of the power management circuit.

6. The compensation circuit according to claim 5, wherein:

when the PDF signal is at a high level, in the first stage, the first diode is turned-on, the second switch is turned-on, and an output of the second switch outputs the common voltage to the display panel; in the first sub-stage, the first switch is turned-on, and the first switch outputs the operating voltage to the operational amplifier circuit; in the second sub-stage, the first switch is turned-off, and thus the first switch stops outputting the operating voltage to the operational amplifier circuit; and when the PDF signal is at a low level, in the second stage, the second diode is turned-on, the first switch is turned-on, and the first switch outputs the operating voltage to the operational amplifier circuit; in the third sub-stage, the second switch is turned-on, the second switch outputs the common voltage to the display panel; in the fourth sub-stage, the second switch is turned-off, and thus the second switch stops outputting the common voltage to the display panel.

7. The compensation circuit according to claim 5, wherein; the delay circuit further comprises a delayer;

an output of the timing controller is respectively connected to a first input of the delayer and a control terminal of the second switch through the first diode, and is respectively connected to a second input of the delayer and a control terminal of the first switch through the second diode;

a first output of the delayer is connected to the control terminal of the first switch, and a second output of the delayer is connected to the control terminal of the second switch;

an input of the first switch is connected to a second output of the power management circuit, and an output of the first switch is connected to a power terminal of the operational amplifier circuit; and an input of the second switch is connected to a first output of the power management circuit, and an output of the second switch is connected to a common voltage terminal of the display panel.

8. The compensation circuit according to claim 7, wherein:

when the PDF signal is at a high level, in the first stage, the first diode is turned-on, the second switch is turned-on, and an output of the second switch outputs the common voltage to the display panel; in the first sub-stage, the delayer stops outputting a high-level PDF signal to the first switch, the first switch is turned-on, and thus the first switch outputs the operating voltage to the operational amplifier circuit; in the second sub-stage, the delayer outputs the high-level PDF signal to the first switch to control the first switch to be turned-off, and thus the first switch stops outputting the operating voltage to the operational amplifier circuit; or alternatively; and when the PDF signal is at a low level, in the second stage, the second diode is turned-on, the first switch is turned-on, and thus the first switch outputs the operating voltage to the operational amplifier circuit; in the third sub-stage, the delayer stops outputting the low-level PDF signal to the second switch, the second switch is turned-on, and thus the second switch outputs the common voltage to the display panel; in the fourth sub-stage, the delayer outputs the low-level PDF signal to the second switch to control the second switch to be turned-off, and thus the second switch stops outputting the common voltage to the display panel.

9. The compensation circuit according to claim 1, wherein the delay circuit is further configured to start or stop outputting the common voltage to the display panel according to a comparison between the feedback voltage and a target threshold value, when the PDF signal controls the display panel to do not perform the polarity inversion.

10. A display device, comprising a display panel and a compensation circuit; the compensation circuit comprising a timing controller, a power management circuit, an operational amplifier circuit, and a delay circuit; wherein:

the timing controller is respectively connected to the display panel and the delay circuit, and is configured to output a partial decode-and-forward (PDF) signal to the display panel and the delay circuit;

the power management circuit is respectively connected to the delay circuit and the operational amplifier circuit, and is configured to output a common voltage and an operating voltage to the delay circuit, and output the common voltage to the operational amplifier circuit;

the delay circuit is further connected to the operational amplifier circuit and the display panel respectively, and is configured to, when the display panel is controlled by the PDF signal to perform a polarity inversion, output the common voltage to the display panel in a first stage, and output the operating voltage to the operational amplifier circuit in a first sub-stage of the first stage, and stop outputting the operating voltage to the operational amplifier circuit in a second sub-stage of the first stage;

the delay circuit is further configured to, when the PDF signal controls the display panel not to perform the polarity inversion, output the operating voltage to the operational amplifier circuit in a second stage, and output the common voltage to the display panel in a third sub-stage of the second stage, and stop outputting the common voltage to the display panel in a fourth sub-stage of the second stage;

the operational amplifier circuit is further connected to the display panel, and is configured to receive the common voltage output by the power management circuit in the first stage and the second stage; the operational amplifier circuit is further configured to receive the operating voltage output by the delay circuit and a feedback voltage output by the display panel in the first sub-stage, the third sub-stage and the fourth sub-stage, and output a compensating voltage to the display panel; and the display panel is configured to display an image and output a feedback voltage to the compensation circuit, and receive the PDF signal, the compensating voltage and the common voltage output by the compensation circuit.

11. The display device according to claim 10, wherein:

the timing controller is configured to detect display problems of the display panel and output a high level PDF signal to the display panel and the delay circuit so as to control the display panel to perform the polarity inversion, when the display panel has a target display problem; and the timing controller is further configured to detect the display problems of the display panel and output a low-level PDF signal to the display panel and the delay circuit when the display panel has a non-target display problem, to enable the display panel to do not perform the polarity inversion, and wherein the display problems comprise greenish or crosstalk of different severity degrees, and the target display problem is used to indicate relatively higher greenish or crosstalk in the display problems.

12. The display device according to claim 11, wherein; the delay circuit comprises a first switch and a second switch;

a control terminal of the second switch is connected to an output of the timing controller, an input of the second switch is connected to a first output of the power management circuit, and an output of the second switch is respectively connected to a common voltage terminal of the display panel and a control terminal of the first switch;

an input of the first switch is connected to a second output of the power management circuit, and an output of the first switch is connected to a power terminal of the operational amplifier circuit; and when the PDF signal is at a high level, in the first stage, the second switch is turned-on and an output of the second switch outputs the common voltage to the display panel;

in the first sub-stage, the first switch is turned-on, and the first switch outputs the operating voltage to the operational amplifier circuit; in the second sub-stage, the first switch is turned-off, and the first switch stops outputting the operating voltage to the operational amplifier circuit.

13. The display device according to claim 11, wherein: the delay circuit comprises a first switch and a second switch;

a control terminal of the first switch is connected to an output of the timing controller, an input of the first switch is connected to a second output of the power management circuit, and an output of the first switch is connected to a power terminal of the operational amplifier circuit and the control terminal of the second switch, respectively;

an input of the second switch is connected to a first output of the power management circuit, and an output of the second switch is connected to a common voltage terminal of the display panel; and when the PDF signal is at a low level, in the second stage, the first switch is turned-on and the first switch outputs the operating voltage to the operational amplifier circuit;

in the third sub-stage, the second switch is turned-on, the second switch outputs the common voltage to the display panel; in the fourth sub-stage, the second switch is turned-off, and thus the second switch stops outputting the common voltage to the display panel.

14. The display device according to claim 11, wherein; the delay circuit comprises a first switch, a second switch, a first diode and a second diode;

an output of the timing controller is connected to a control terminal of the second switch through the first diode, and is connected to a control terminal of the first switch through the second diode;

a control terminal of the first switch is further connected to an output of the second switch, an input of the first switch is connected to a second output of the power management circuit, and an output of the first switch is respectively connected to a control terminal of the second switch and a power terminal of the operational amplifier circuit; and the output of the second switch is further connected to a common voltage terminal of the display panel, and an input of the second switch is connected to a first output of the power management circuit.

15. The display device according to claim 14, wherein:

when the PDF signal is at a high level, in the first stage, the first diode is turned-on, the second switch is turned-on, and an output of the second switch outputs the common voltage to the display panel; in the first sub-stage, the first switch is turned-on, and the first switch outputs the operating voltage to the operational amplifier circuit; in the second sub-stage, the first switch is turned-off, and thus the first switch stops outputting the operating voltage to the operational amplifier circuit; and when the PDF signal is at a low level, in the second stage, the second diode is turned-on, the first switch is turned-on, and the first switch outputs the operating voltage to the operational amplifier circuit; in the third sub-stage, the second switch is turned-on, the second switch outputs the common voltage to the display panel; in the fourth sub-stage, the second switch is turned-off, and thus the second switch stops outputting the common voltage to the display panel.

16. The display device according to claim 14, wherein: the delay circuit further comprises a delayer;

an output of the timing controller is respectively connected to a first input of the delayer and a control terminal of the second switch through the first diode, and is respectively connected to a second input of the delayer and a control terminal of the first switch through the second diode;

a first output of the delayer is connected to the control terminal of the first switch, and a second output of the delayer is connected to the control terminal of the second switch;

an input of the first switch is connected to a second output of the power management circuit, and an output of the first switch is connected to a power terminal of the operational amplifier circuit; and an input of the second switch is connected to a first output of the power management circuit, and an output of the second switch is connected to a common voltage terminal of the display panel.

17. The display device according to claim 16, wherein:

when the PDF signal is at a high level, in the first stage, the first diode is turned-on, the second switch is turned-on, and an output of the second switch outputs the common voltage to the display panel; in the first sub-stage, the delayer stops outputting a high-level PDF signal to the first switch, the first switch is turned-on, and thus the first switch outputs the operating voltage to the operational amplifier circuit; in the second sub-stage, the delayer outputs the high-level PDF signal to the first switch to control the first switch to be turned-off, and thus the first switch stops outputting the operating voltage to the operational amplifier circuit; or alternatively; and when the PDF signal is at a low level, in the second stage, the second diode is turned-on, the first switch is turned-on, and thus the first switch outputs the operating voltage to the operational amplifier circuit; in the third sub-stage, the delayer stops outputting the low-level PDF signal to the second switch, the second switch is turned-on, and thus the second switch outputs the common voltage to the display panel; in the fourth sub-stage, the delayer outputs the low-level PDF signal to the second switch to control the second switch to be turned-off, and thus the second switch stops outputting the common voltage to the display panel.

18. The display device according to claim 10, wherein the delay circuit is further configured to start or stop outputting the common voltage to the display panel according to a comparison between the feedback voltage and a target threshold value, when the PDF signal controls the display panel to do not perform the polarity inversion.

* * * * *